US011518325B2

(12) United States Patent
Nogiwa et al.

(10) Patent No.: US 11,518,325 B2
(45) Date of Patent: Dec. 6, 2022

(54) REINFORCEMENT MEMBER FOR VEHICLE, AND METHOD FOR MANUFACTURING SAME

(71) Applicant: SUMITOMO HEAVY INDUSTRIES, LTD., Tokyo (JP)

(72) Inventors: Kimihiro Nogiwa, Ehime (JP); Masayuki Ishizuka, Ehime (JP); Norieda Ueno, Tokyo (JP); Kenta Watanabe, Ehime (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 133 days.

(21) Appl. No.: 17/122,528

(22) Filed: Dec. 15, 2020

(65) Prior Publication Data

US 2021/0094493 A1      Apr. 1, 2021

Related U.S. Application Data

(63) Continuation of application No. PCT/JP2019/030299, filed on Aug. 1, 2019.

(30) Foreign Application Priority Data

Aug. 1, 2018   (JP) ............................. JP2018-145200

(51) Int. Cl.
  *B60R 19/18*     (2006.01)
  *B21D 26/033*   (2011.01)
  *B60R 19/04*     (2006.01)

(52) U.S. Cl.
  CPC ............ *B60R 19/18* (2013.01); *B21D 26/033* (2013.01); *B60R 19/04* (2013.01)

(58) Field of Classification Search
  CPC ........ B60R 19/18; B60R 19/04; B21D 26/033
  See application file for complete search history.

(56) References Cited

U.S. PATENT DOCUMENTS

| 8,408,632 B2 | 4/2013 | Shimotsu et al. |
| 8,985,651 B2 | 3/2015 | Honda et al. |
| 2018/0361458 A1 | 12/2018 | Ishizuka et al. |

FOREIGN PATENT DOCUMENTS

| JP | 2003-104140 A | 4/2003 |
| JP | 2014-088125 A | 5/2014 |

(Continued)

OTHER PUBLICATIONS

International Search Report issued in Application No. PCT/JP2019/030299 dated Sep. 24, 2019.

*Primary Examiner* — D Glenn Dayoan
*Assistant Examiner* — Melissa Ann Bonifazi
(74) *Attorney, Agent, or Firm* — Michael Best & Friedrich LLP

(57) ABSTRACT

There is provided a reinforcement member for a vehicle which includes a cylindrical body section having a continuously closed cross section intersecting with a longitudinal direction. The cylindrical body section has a first surface, a second surface, and a third surface. The third surface has a fourth surface extending away from the second surface, and a fifth surface connecting the fourth surface and the first surface to each other. In a sectional view when viewed in the longitudinal direction, in a case where a virtual line connecting a first intersection portion where the first surface and the third surface intersect with each other and a second intersection portion where the second surface and the third surface intersect with each other is set, a third intersection portion where the fourth surface and the fifth surface intersect with each other protrudes outward with respect to the virtual line.

17 Claims, 12 Drawing Sheets

(56) References Cited

FOREIGN PATENT DOCUMENTS

| JP | 5564237 B2 | 7/2014 |
| JP | 2017-170466 A | 9/2017 |
| WO | WO-2017/150110 A1 | 9/2017 |

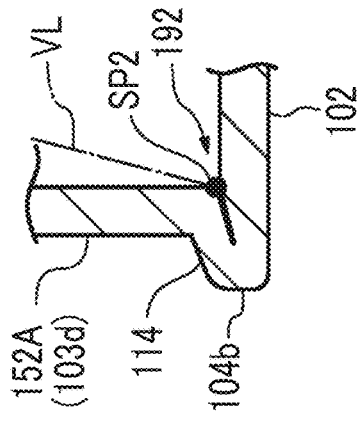
FIG. 11A
FIG. 11B
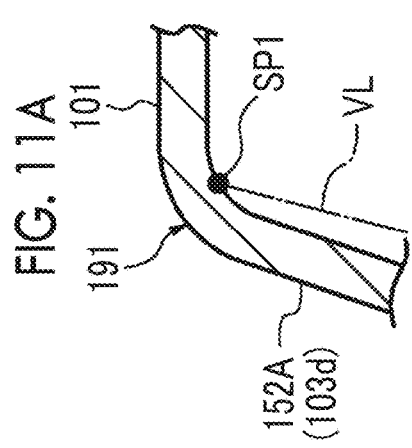
FIG. 11C
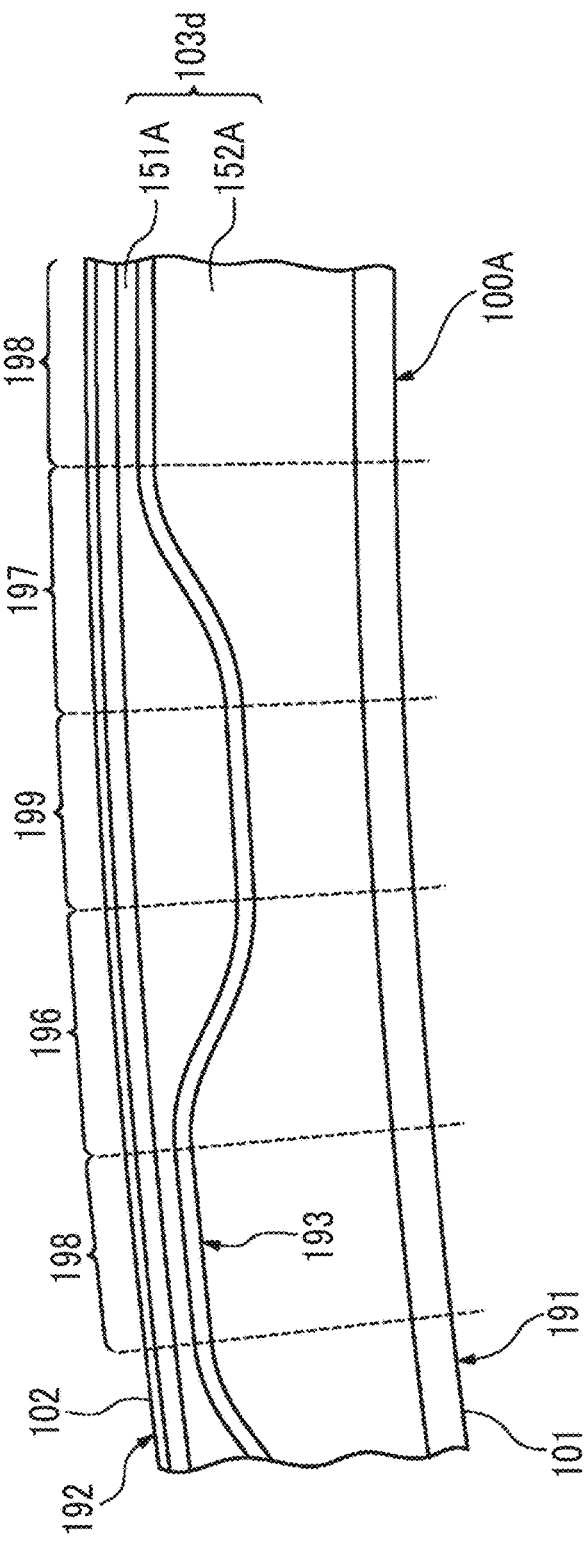
FIG. 11D

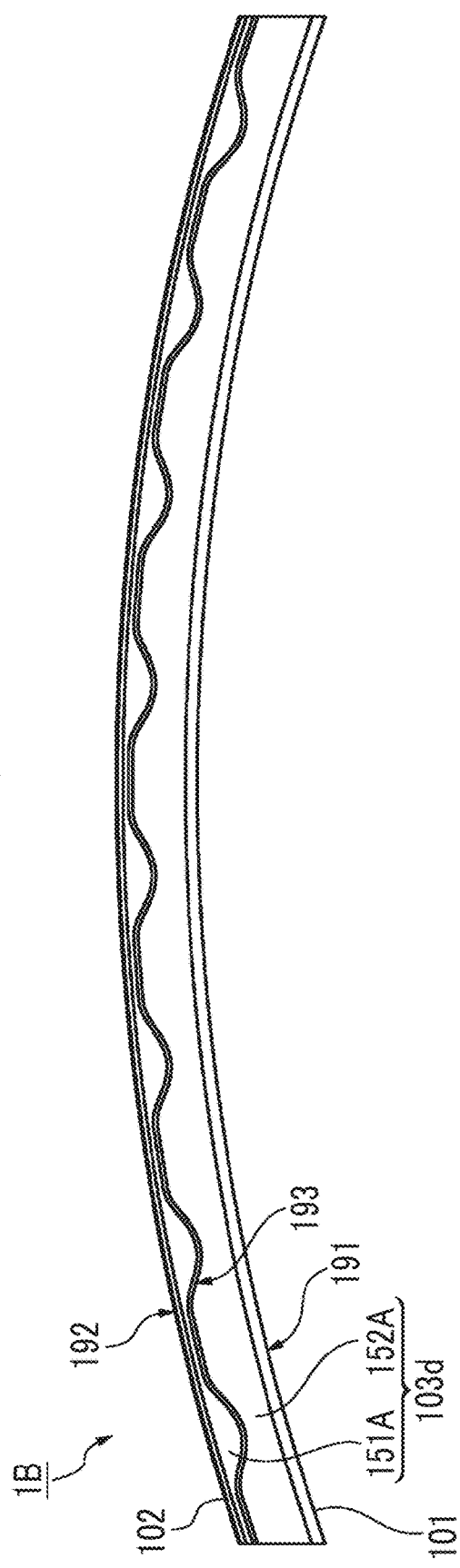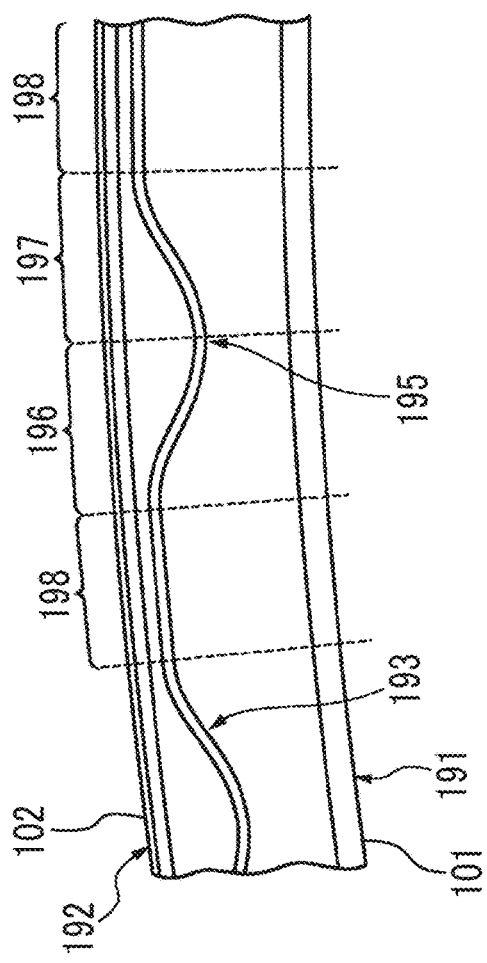

REINFORCEMENT MEMBER FOR VEHICLE, AND METHOD FOR MANUFACTURING SAME

RELATED APPLICATIONS

The contents of Japanese Patent Application No. 2018-145200, and of International Patent Application No. PCT/JP2019/030299, on the basis of each of which priority benefits are claimed in an accompanying application data sheet, are in their entirety incorporated herein by reference.

BACKGROUND

Technical Field

A certain embodiment of the present invention relates to a reinforcement member for a vehicle and a method for manufacturing the same.

Description of Related Art

The related art below discloses a bumper reinforcement material used in a vehicle as one type of a shock absorbing material. The related art disclose a first aspect in which a front reinforcement member and a rear reinforcement member are separate sheet metal members, and a second aspect in which the front reinforcement member and the rear reinforcement member are integrated sheet metal members.

SUMMARY

According to one embodiment of the present invention, there is provided a reinforcement member for a vehicle which includes a cylindrical body section having a continuously closed cross section intersecting with a longitudinal direction. The cylindrical body section has a first surface located inside a vehicle when mounted on the vehicle, a second surface separated from and facing the first surface, and a third surface connecting the first surface and the second surface to each other. The third surface has a fourth surface extending away from the second surface, and a fifth surface connecting the fourth surface and the first surface to each other. In a sectional view when viewed in the longitudinal direction, in a case where a virtual line connecting a first intersection portion where the first surface and the third surface intersect with each other and a second intersection portion where the second surface and the third surface intersect with each other is set, a third intersection portion where the fourth surface and the fifth surface intersect with each other protrudes outward with respect to the virtual line. The cylindrical body section has a changing portion where a position of the third intersection portion in a mutually facing direction of the first surface and the second surface is changed along the longitudinal direction.

According to another embodiment of the present invention, there is provided a method for manufacturing the reinforcement member for the vehicle. The method includes preparing a metal pipe between a first die and a second die, forming a space for molding the cylindrical body section between the first die and the second die by moving at least one of the first die and the second die in a direction in which the dies join to each other, and molding the cylindrical body section in the space by supplying gas into the metal pipe which is heated.

BRIEF DESCRIPTION OF THE DRAWINGS

FIG. 11A is an enlarged sectional view of a first intersection portion. FIG. 11B is an enlarged sectional view of a third intersection portion. FIG. 11C is an enlarged sectional view of a second intersection portion. FIG. 11D is an enlarged view when a shape pattern of the third intersection portion is viewed in a transverse direction.

FIG. 12A is a view when another example of the shape pattern of the third intersection portion is viewed in the transverse direction. FIG. 12B is an enlarged view thereof.

DETAILED DESCRIPTION

Figure 1:
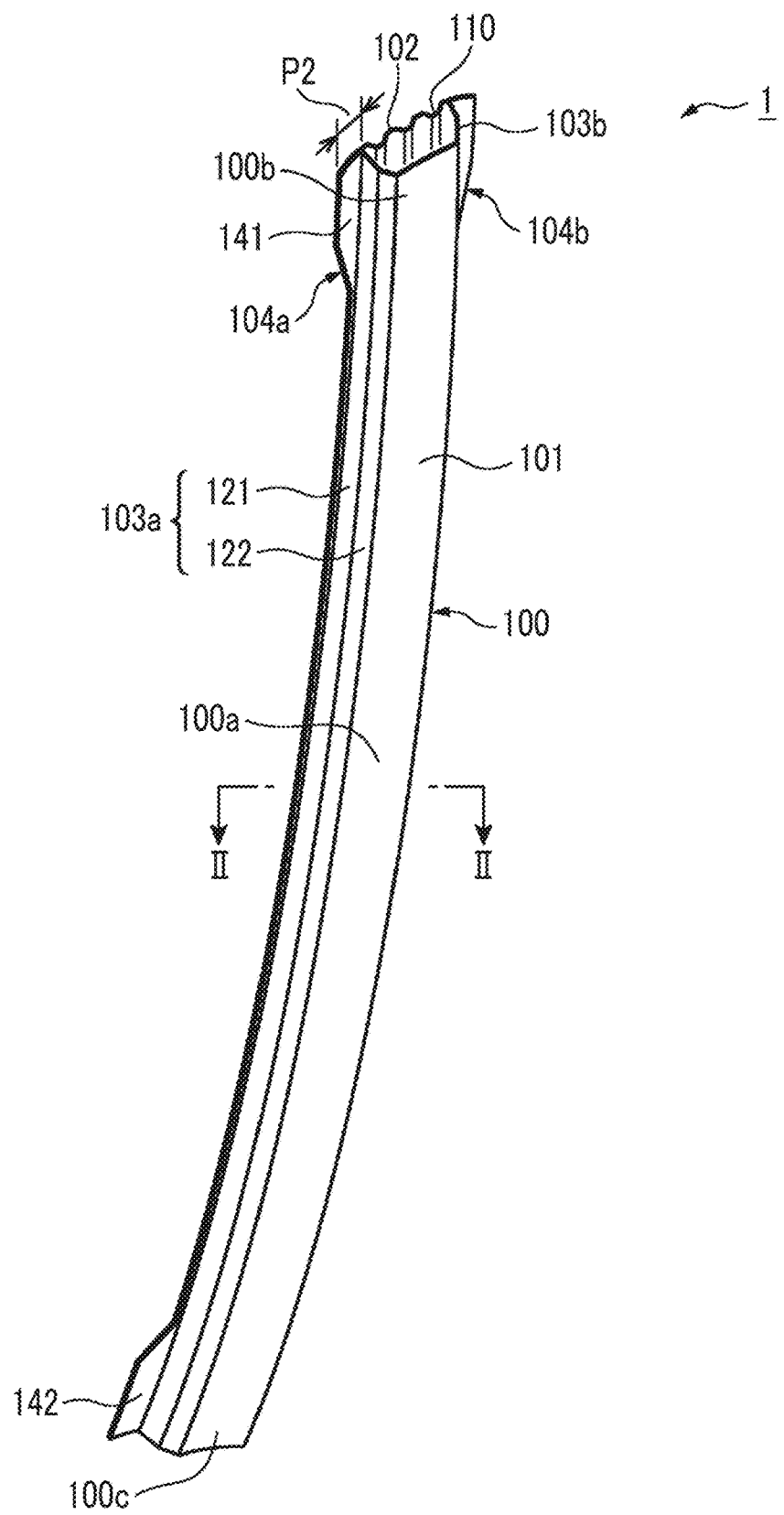
FIG. 1 is a schematic perspective view illustrating a vehicle reinforcement member.

In the first aspect, the bumper reinforcement material is formed by welding a flange portion provided in each of the front reinforcement material and the rear reinforcement material. Therefore, when a shock is applied to the bumper reinforcement material, a force is concentrated on a welded location in the flange portion, and the front reinforcement material and the rear reinforcement material are divided from each other. As a result, shock absorption of the bumper reinforcement material is not sufficiently achieved.

In the second aspect, the bumper reinforcement material is formed by performing roll forming on the integrated sheet metal. The flange portion of the bumper reinforcement material is formed by folding the sheet metal. Therefore, unlike the first aspect, the front reinforcement material and the rear reinforcement material are unless likely to be divided from each other. However, in the second aspect, the bumper reinforcement material does not form a continuously closed cross section, and a portion of the rear reinforcement material is divided. As a result, the shock absorption of the above-described portion of the rear reinforcement material tends to be poor. Therefore, the shock absorption of the bumper reinforcement material may be insufficiently achieved.

It is desirable to provide a reinforcement member for a vehicle and a method for manufacturing the same, which achieve satisfactory shock absorption.

The reinforcement member for a vehicle includes a cylindrical body section having the continuously closed cross section. Therefore, even when a shock is applied to the reinforcement member for the vehicle, the cylindrical body section is prevented from being divided into one part and the other part. In addition, the cylindrical body section has no location divided in advance. Therefore, a part having poor shock resistance is unlikely to be formed in the cylindrical body section. In addition, in a sectional view when viewed in the longitudinal direction, in a case where the virtual line connecting the first intersection portion where the first surface and the third surface intersect with each other and the second intersection portion where the second surface and the third surface intersect with each other is set, the third intersection portion where the fourth surface and the fifth surface intersect with each other protrudes outward with respect to the virtual line. In this cross-sectional shape, the cylindrical body section has the changing portion in which the position of the third intersection portion in the mutually facing direction of the first surface and the second surface is changed along the longitudinal direction. In this case, the cylindrical body section has a plurality of locations where the positions of the third intersection portions are different from each other in the facing direction. When a shock is applied to the second surface, the locations deform in mutually different deformation modes in a sectional view. In this way, according to the cylindrical body section in which the locations having the mutually different deformation modes are present in the longitudinal direction, crushing of the cross section can be suppressed, and load resistant performance can be improved, compared to a case where the locations have a constant deformation mode in the longitudinal direction. Therefore, according to the vehicle reinforcement member, satisfactory shock absorption can be achieved.

As the changing portion, the cylindrical body section may have a first changing portion where the position of the third intersection portion is changed from the first surface side to the second surface side, toward one side in the longitudinal direction, and a second changing portion where the position of the third intersection portion is changed from the second surface side to the first surface side, toward one side in the longitudinal direction. In this case, it is possible to form three or more locations having the mutually different deformation modes in the longitudinal direction.

In at least a portion of the cylindrical body section in the longitudinal direction, the first changing portion and the second changing portion may be alternately formed along the longitudinal direction in a predetermined pattern having repeated shapes. In this case, in the cylindrical body section, a location where the position of the third intersection portion is close to the second surface and a location where the position of the third intersection portion is far from the second surface are alternately formed. In this case, load resistant performance of the cylindrical body section can be further improved.

Between the first changing portion and the second changing portion, the cylindrical body section has a non-changing portion where the position of the third intersection portion is constant along the longitudinal direction. In this case, at least one of the location where the position of the third intersection portion is close to the second surface and the location where the position of the third intersection portion is far from the second surface is configured to be continuous in a constant cross section. In this case, the load resistant performance of the cylindrical body section is easily adjusted by adjusting a length of the constant cross section.

According to the method for manufacturing the reinforcement member for the vehicle, the cylindrical body section is molded using the metal pipe. Therefore, the cylindrical body section having the continuously closed cross section which does not include divided parts is provided. Therefore, even when a shock is applied to the reinforcement member for the vehicle, the cylindrical body section is prevented from being divided into one part and the other part. In addition, a part having poor shock resistance is unlikely to be formed in the cylindrical body section. Therefore, according to the above-described manufacturing method, it is possible to manufacture a reinforcement member for a vehicle, in which satisfactory shock absorption is achieved.

Hereinafter, an embodiment of a vehicle reinforcement member and a method for manufacturing the same according to the present invention will be described with reference to the drawings. In each drawing, the same reference numerals will be assigned to the same or corresponding elements, and repeated description will be omitted.

Figure 2:
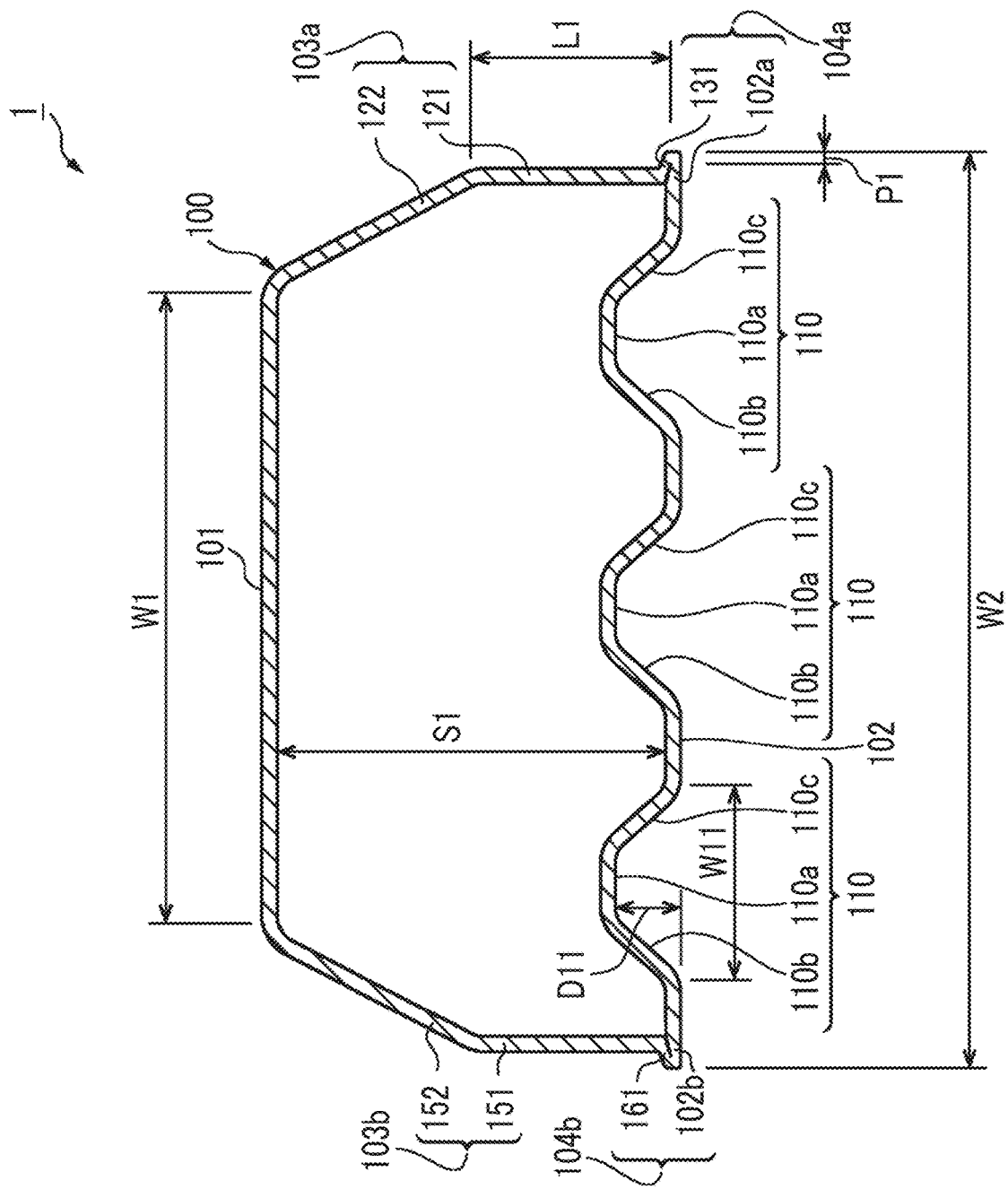
FIG. 2 is a sectional view taken along line II-II in FIG. 1.

FIG. 1 is a schematic perspective view illustrating the vehicle reinforcement member. FIG. 2 is a sectional view taken along line II-II in FIG. 1. A vehicle reinforcement member 1 illustrated in FIGS. 1 and 2 is a reinforcement member mounted on a vehicle such as an automobile, and absorbs a shock generated when the vehicle is collided. In the present embodiment, for example, the vehicle reinforcement member 1 is a bumper beam installed inside a front bumper of the vehicle, and is a hollow member extending along a vehicle width direction. Therefore, when the vehicle reinforcement member 1 is mounted on the vehicle, a longitudinal direction of the vehicle reinforcement member 1 corresponds to the vehicle width direction.

The vehicle reinforcement member 1 includes a metal-made cylindrical body section 100 having a continuously closed cross section intersecting with the longitudinal direction. The cylindrical body section 100 has a polygonal shape in a cross section. A member having the continuously closed cross section is a member configured to include a ring or a metal pipe having an annular shape in a cross section in advance. The cylindrical body section 100 according to the present embodiment is configured to include a single metal pipe. That is, the cylindrical body section 100 is not configured so that a plurality of sheet metals are welded together, and is not configured so that one sheet metal is processed (for example, roll forming). Therefore, there is no abutment joint (joint) in the cross section of the cylindrical body section 100. For example, the metal pipe is a cylindrical member formed of high strength steel or ultra-high strength steel. The high strength steel is a steel material having tensile strength of 400 MPa or higher. The ultra-high strength steel is a steel material having tensile strength of 1 GPa or higher. In addition, without being particularly limited, a thickness of the cylindrical body section 100 is from 1.0 mm to 2.3 mm, for example.

The cylindrical body section 100 includes a first surface 101, a second surface 102 separated from and facing the first surface 101, a pair of third surfaces 103a and 103b connecting the first surface 101 and the second surface 102 to each other, and a pair of protrusion portions 104a and 104b. Each of the first surface 101, the second surface 102, and the pair of third surfaces 103a and 103b has an outer peripheral surface and an inner peripheral surface.

The first surface 101 is a portion located inside the vehicle when the cylindrical body section 100 is mounted on the vehicle. For example, when the vehicle reinforcement member 1 is a front bumper beam, the first surface 101 is located in a rear section of the vehicle. The first surface 101 has a substantially flat plate shape, and is formed to draw a substantially arc shape.

The second surface 102 is a portion located outside the vehicle when the cylindrical body section 100 is mounted on the vehicle. Therefore, when the cylindrical body section 100 is mounted on the vehicle, the second surface 102 functions as a surface that first receives a shock. For example, when the vehicle reinforcement member 1 is the front bumper beam, the second surface 102 is located in a front section of the vehicle. In this case, a mutually facing direction of the first surface 101 and the second surface 102 (hereinafter, simply abbreviated as a "facing direction") corresponds to a vehicle forward-rearward direction. In addition, a vehicle upward-downward direction corresponds to a transverse direction perpendicular to the longitudinal direction. The second surface 102 is a plate-shaped portion formed to draw a substantially arc shape as in the first surface 101. In the transverse direction, a width W2 of the second surface 102 is larger than a width W1 of the first surface 101. For example, the width W1 is from 60% to 90% of the width W2.

The second surface 102 is provided with a plurality of grooves 110 which are separated from each other. Each of the plurality of grooves 110 is provided to improve shock resistance of the second surface 102. Each of the plurality of grooves 110 is a portion extending along the longitudinal direction, and recessed toward the first surface 101 from a surface of the second surface 102. A cross section intersecting with the longitudinal direction of each of the grooves 110 has a substantially trapezoidal shape. Each of the grooves 110 has a bottom surface 110*a* and side surfaces 110*b* and 110*c*. The side surface 110*b* is an inclined surface inclined to be closer to the side surface 110*c* as the side surface 110*b* is closer to the bottom surface 110*a*. Similarly, the side surface 110*c* is an inclined surface inclined to be closer to the side surface 110*b* as the side surface 110*c* is closer to the bottom surface 110*a*. For example, a depth D11 of each of the grooves 110 is from 5% to 25% of a distance S1 between the first surface 101 and the second surface 102 in the facing direction. In addition, a width W11 of each of the grooves 110 is from 10% to 30% of the width W2 of the second surface 102.

The third surface 103*a* is a portion connecting one end of the first surface 101 in the transverse direction and one end of the second surface 102 in the transverse direction to each other. The third surface 103*a* has a fourth surface 121 extending from the second surface 102, and a fifth surface 122 connecting the fourth surface 121 and the one end of the first surface 101 to each other. Each of the fourth surface 121 and the fifth surface 122 has a substantially flat plate shape. In the facing direction, for example, a length L1 of the fourth surface 121 is from 20% to 80% of the distance S1 between the first surface 101 and the second surface 102.

An angle formed between the fourth surface 121 and the second surface 102 is a right angle or an acute angle near the right angle. The acute angle near the right angle is from 85° to 90°, for example. Therefore, the fourth surface 121 extends toward the fifth surface 122 to be away from the second surface 102. Therefore, a space is formed by an inner peripheral surface of the second surface 102, an inner peripheral surface of the fourth surface 121, and an inner peripheral surface of the groove 110 closest to the fourth surface 121. For example, a diameter of a circle (inscribed circle) accommodated in the space and in contact with the inner peripheral surface of the second surface 102, the inner peripheral surface of the fourth surface 121, and the side surface 110*c* of the groove 110 closest to the fourth surface 121 is larger than a protrusion amount (details will be described later) of the protrusion portion 104*a*. The diameter of the inscribed circle is 10 mm or larger, for example. Alternatively, a distance between the inner peripheral surface of the fourth surface 121 and the side surface 110*c* of the groove 110 closest to the fourth surface 121 may be larger than a protrusion amount P1 (details will be described later) of the protrusion portion 104*a*, or may be larger than a protrusion amount P2 (details will be described later), for example.

The protrusion portion 104*a* is a portion provided to improve shock resistance of the cylindrical body section 100, and protrudes in the transverse direction. Since the protrusion portion 104*a* is provided, when a shock is applied to the cylindrical body section 100 from the second surface 102 side, the third surface 103*a* deforms inward. The protrusion portion 104*a* is formed by folding a portion of the cylindrical body section 100. The portion of the cylindrical body section 100 includes an end portion 102*a* (first end portion) of the second surface 102 and an end portion 131 (second end portion) of the third surface 103*a*. That is, the protrusion portion 104*a* is formed by folding the portions including the end portions 102*a* and 131 in the cylindrical body section 100. As illustrated in FIG. 1, the protrusion amount of the protrusion portion 104*a* varies between a central portion 100*a* of the cylindrical body section 100 in the longitudinal direction and the end portions 100*b* and 100*c* of the cylindrical body section 100 in the longitudinal direction. Each of the portion 141 located in the end portion 100*b* in the protrusion portion 104*a* and the portion 142 located in the end portion 100*c* in the protrusion portion 104*a* not only can improve the shock resistance of the cylindrical body section 100, but also can function as a connection portion to be connected to other members. For example, spot welding is performed on each of the portions 141 and 142. Alternatively, each of the portions 141 and 142 may be provided with an opening into which a fastening member is inserted.

In the present embodiment, the protrusion amount P1 of the protrusion portion 104*a* in the central portion 100*a* is smaller than the protrusion amount P2 of the portions 141 and 142 (that is, the protrusion amount of the protrusion portion 104*a* in the end portions 100*b* and 100*c*). From a viewpoint of sufficiently improving the shock resistance achieved by the protrusion portion 104*a*, the protrusion amount P1 is set to 1 mm or larger, for example. From a viewpoint of reliably forming the protrusion portion 104*a*, the protrusion amount P1 may be set to 2 mm or larger, for example. As will be described later, the protrusion portion 104*a* is formed by a molding method using a die. Therefore, in order to form the protrusion portion 104*a*, it is not necessary to weld the end portion 102*a* of the second surface 102 and the end portion 131 of the third surface 103*a* to each other. Therefore, in the protrusion portion 104*a*, the protrusion amount required for welding may not be secured. For example, Japanese Unexamined Patent Publication No. 2017-170466 discloses that a width of a flange portion needs to be secured to have approximately 15 mm to 20 mm in order to perform spot welding on the flange portion. In addition, in the above-described publication, even when laser welding is performed on the flange portion, the width of the flange portion needs to be secured to have at least approximately 5 mm. In contrast, the protrusion amount P1 may be 5 mm or smaller, 4 mm or smaller, 3 mm or smaller, or 2 mm or smaller. On the other hand, the protrusion amount P2 of the portions 141 and 142 may be 10 mm or larger, 15 mm or larger, or 20 mm or larger. In this case, the spot welding can be easily performed on the portions 141 and 142.

The third surface 103*b* is a portion connecting the other end of the first surface 101 in the transverse direction and the other end of the second surface 102 in the transverse direction. As in the third surface 103*a*, the third surface 103*b* has a fourth surface 151 extending from the second surface 102, and a fifth surface 152 connecting the fourth surface 151 and the other end of the first surface 101. The fourth surfaces 121 and 151 have shapes substantially the same as each other, and the fifth surfaces 122 and 152 have shapes substantially the same as each other. Therefore, as in the fourth surface 121, the fourth surface 151 extends toward the fifth surface 152 to be away from the second surface 102.

As in the protrusion portion 104a, the protrusion portion 104b is a portion provided to improve the shock resistance of the cylindrical body section 100, and protrudes in the transverse direction. The protrusion portion 104b is located on a side opposite to the protrusion portion 104a in the transverse direction. The protrusion portion 104b is also formed by folding a portion of the cylindrical body section 100. The portion of the cylindrical body section 100 includes an end portion 102b (first end portion) of the second surface 102 and an end portion 161 (second end portion) of the third surface 103a. The protrusion portion 104b has a shape substantially the same as that of the protrusion portion 104a. Therefore, the protrusion amount of the protrusion portion 104b varies between the central portion 100a in the longitudinal direction and the end portions 100b and 100c in the longitudinal direction.

Next, a method for manufacturing the vehicle reinforcement member 1 according to the present embodiment will be described with reference to FIGS. 3 to 6C. First, a molding apparatus for molding the vehicle reinforcement member 1 will be described with reference to FIGS. 3 to 5.

Configuration of Molding Apparatus

Figure 3:
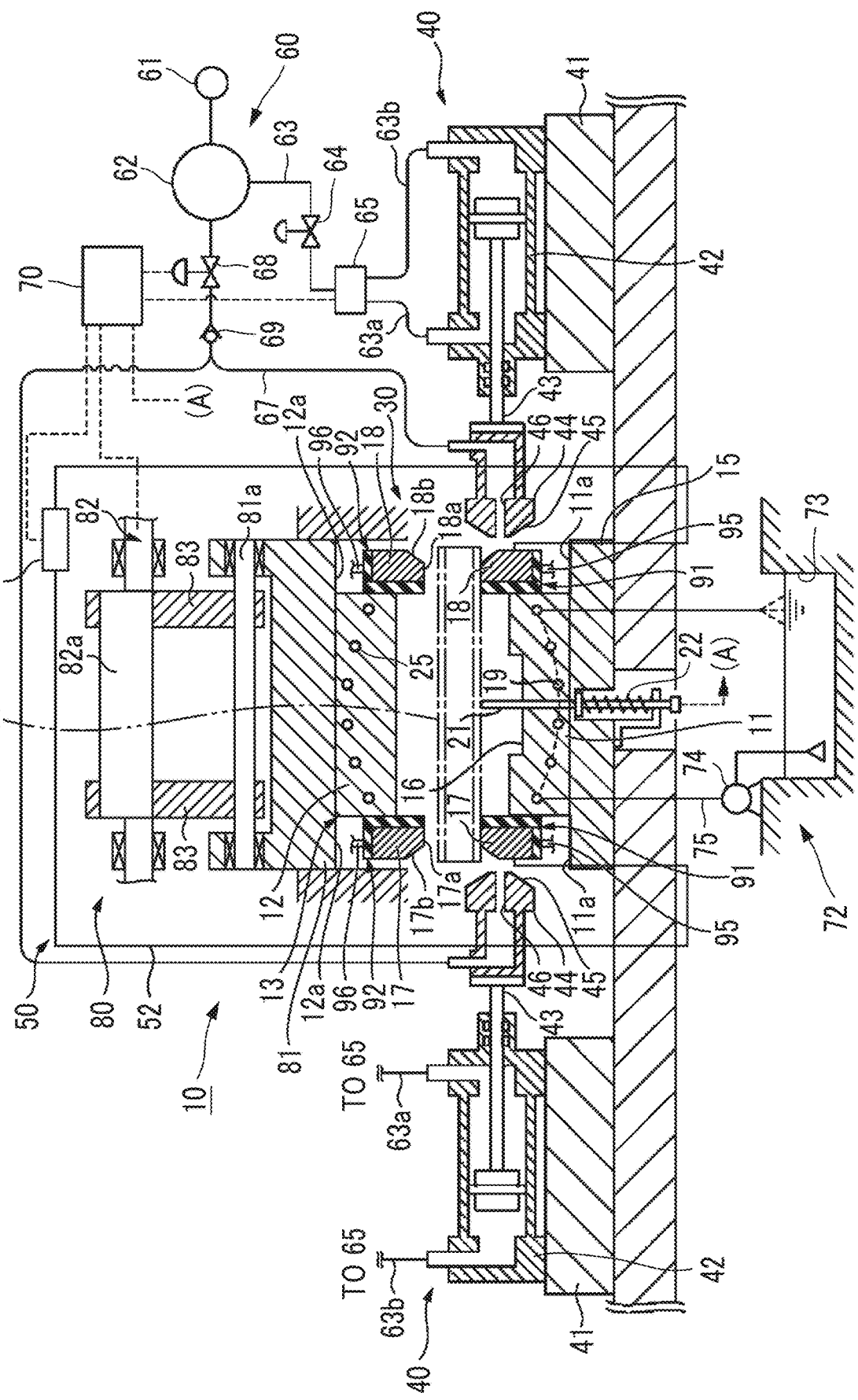
FIG. 3 is a schematic configuration diagram of a molding apparatus for molding the vehicle reinforcement member.

FIG. 3 is a schematic configuration diagram of the molding apparatus. As illustrated in FIG. 3, the molding apparatus 10 for molding the vehicle reinforcement member 1 has a molding die (molding unit) 13 having an upper die (die) 12 and a lower die (die) 11 which are paired with each other, a drive mechanism 80 that moves at least one of the upper die 12 and the lower die 11, a pipe holding mechanism 30 that holds a metal pipe 14 disposed between the upper die 12 and the lower die 11, a heating mechanism 50 that energizes and heats the metal pipe 14 held by the pipe holding mechanism 30, a gas supply unit 60 for supplying gas (gas) into the metal pipe 14 held and heated between the upper die 12 and the lower die 11, a pair of gas supply sections 40 and 40 for supplying the gas from the gas supply unit 60 into the metal pipe 14 held by the pipe holding mechanism 30, and a water circulation mechanism 72 that forcibly cools the molding die 13 by using water, and further includes a control unit 70 that controls driving of the drive mechanism 80, driving of the pipe holding mechanism 30, driving of the heating mechanism 50, and gas supply of the gas supply unit 60, respectively.

The molding die 13 is a die used for molding the metal pipe 14. Therefore, the lower die 11 included in the molding die 13 is provided with a cavity (recessed part) which accommodates the metal pipe 14 (details will be described later).

The lower die 11 is fixed to a large base 15. The lower die 11 is configured to include a large steel block, and has a cavity 16 on an upper surface thereof. A cooling water passage 19 is formed in the lower die 11. In addition, the lower die 11 includes a thermocouple 21 inserted into a substantially central portion from below. The thermocouple 21 is temperature measuring means supported by a spring 22 to be movable upward and downward. When a correlation between an energizing time and a temperature can be obtained, the temperature measuring means may be omitted.

An electrode storage space 11a is provided in the vicinity of right and left ends (right and left ends in FIG. 3) of the lower die 11. Electrodes (lower electrodes) 17 and 18 configured to be movable forward and rearward and upward and downward are provided inside the electrode storage space 11a. Insulating materials 91 for preventing energizing are respectively provided between the lower die 11 and the lower electrode 17, in a lower portion of the lower electrode 17, between the lower die 11 and the lower electrode 18, and in a lower portion of the lower electrode 18. Each of the insulating materials 91 is fixed to a forward and rearward movable rod 95 that is a movable portion of an actuator (not illustrated) forming the pipe holding mechanism 30. The actuator is provided to move the lower electrodes 17 and 18 upward and downward, and a fixing portion of the actuator is held by the base 15 side together with the lower die 11.

Figure 4A:
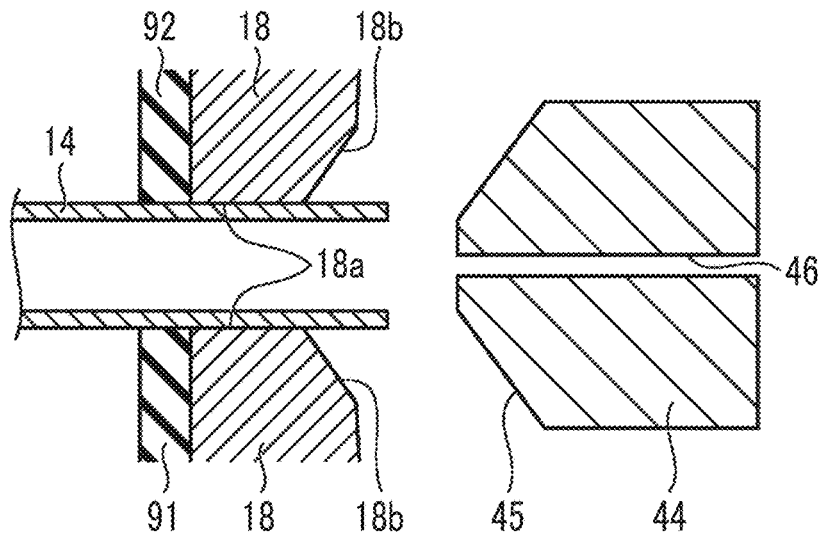
FIG. 4A is a view illustrating a state where an electrode holds a metal pipe.
Figure 4B:
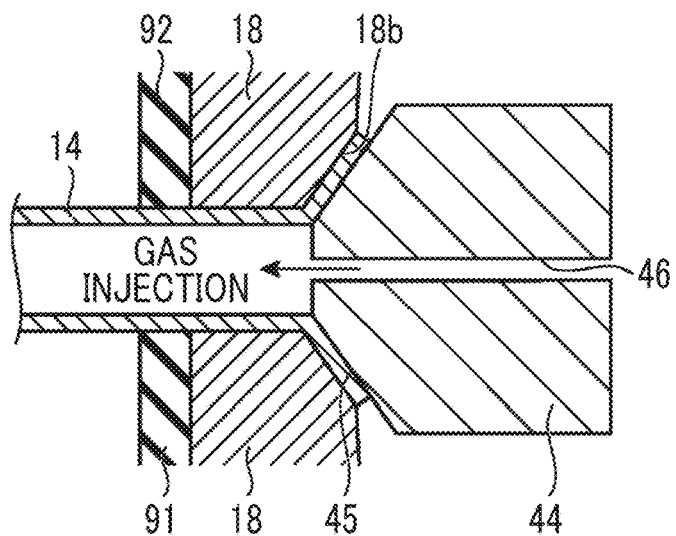
FIG. 4B is a view illustrating a state where a gas supply nozzle is in contact with the electrode.
Figure 4C:
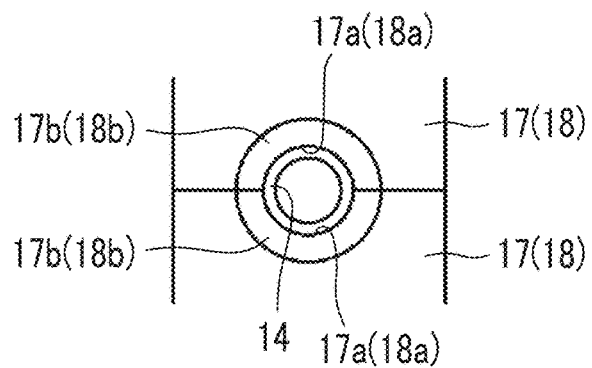
FIG. 4C is a front view of the electrode.

Semi-arc-shaped concave grooves 17a and 18a corresponding to a lower outer peripheral surface of the metal pipe 14 are respectively formed on an upper surfaces of the lower electrodes 17 and 18 (refer to FIG. 4C). Therefore, the pair of lower electrodes 17 and 18 located on the lower die 11 side form a portion of the pipe holding mechanism 30, and can support the metal pipe 14 to be raised and lowered between the upper die 12 and the lower die 11. The metal pipe 14 supported by the lower electrodes 17 and 18 is fitted to and placed in the concave grooves 17a and 18a, for example. Front surfaces (surfaces in an outward direction of the mold) of the lower electrodes 17 and 18 have tapered recessed surfaces 17b and 18b recessed so that a periphery is inclined in a tapered shape toward the concave grooves 17a and 18a. The insulating material 91 has a semi-arc-shaped concave groove communicating with the concave grooves 17a and 18a and corresponding to the outer peripheral surface of the metal pipe 14.

As in the lower die 11, the upper die 12 is configured to include a large steel block, and is fixed to a slide 81 (details will be described later) forming the drive mechanism 80. A cooling water passage 25 is provided inside the upper die 12.

An electrode storage space 12a similar to that of the lower die 11 is provided in the vicinity of right and left ends (right and left ends in FIG. 3) of the upper die 12. As in the lower die 11, electrodes (upper electrodes) 17 and 18 configured to be movable forward and rearward and upward and downward are provided inside the electrode storage space 12a. Insulating materials 92 for preventing energizing are respectively provided between the upper die 12 and the upper electrode 17, in an upper portion of the upper electrode 17, between the upper die 12 and the upper electrode 18, and in an upper portion of the upper electrode 18. Each of the insulating materials 92 is fixed to a forward and rearward movable rod 96 that is a movable portion of an actuator (not illustrated) forming the pipe holding mechanism 30. The actuator is provided to move the upper electrodes 17 and 18 upward and downward, and a fixing portion of the actuator is held by the drive mechanism 80 side together with the upper die 12.

Semi-arc-shaped concave grooves 17a and 18a corresponding to an upper outer peripheral surface of the metal pipe 14 are respectively formed on the lower surface of the upper electrodes 17 and 18 (refer to FIG. 4C). Therefore, the upper electrodes 17 and 18 form another portion of the pipe holding mechanism 30. When the metal pipe 14 is pinched between the pair of upper and lower electrodes 17 and 18 in the upward-downward direction, the entire outer periphery of the metal pipe 14 can be surrounded to be in close contact. Front surfaces (surfaces in an outward direction of the mold) of the upper electrodes 17 and 18 have the tapered recessed surfaces 17b and 18b recessed so that the periphery is inclined in a tapered shape toward the concave grooves 17a and 18a. The insulating material 92 has a semi-arc-shaped concave groove communicating with the concave grooves 17a and 18a and corresponding to the outer peripheral surface of the metal pipe 14.

Figure 5:
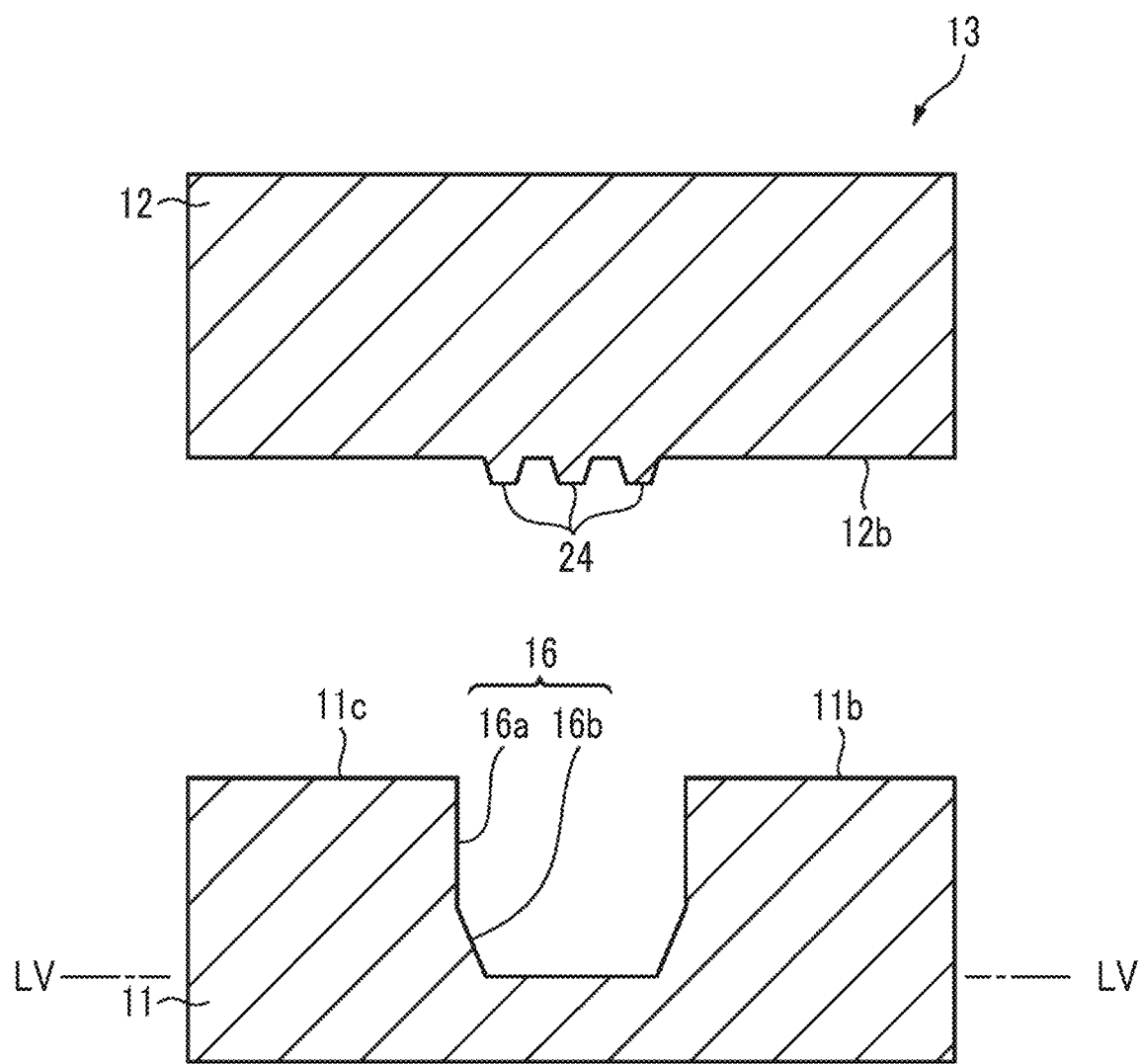
FIG. 5 is a schematic sectional view of a molding die.

FIG. 5 is a schematic sectional view of the molding die 13. As illustrated in FIG. 5, when the surface of the cavity 16 in the center of the lower die 11 is set to a reference line LV, on the upper surface of the lower die 11, a first protrusion 11b is formed on one side of the cavity 16 (right side in FIG. 5, a paper back side in FIG. 3), and a second protrusion 11c is formed on the other side of the cavity 16 (left side in FIG. 5, a paper front side in FIG. 3). Tip surfaces of the first protrusion 11b and the second protrusion 11c respectively have a flat surface. The protrusion amounts from the reference line LV is substantially the same as each other in the first protrusion 11b and the second protrusion 11c. The cavity 16 has a first portion 16a connected to the first protrusion 11b and the second protrusion 11c, and a second portion 16b connected to the first portion 16a. The first portion 16a is a portion for molding the fourth surfaces 121 and 151 of the vehicle reinforcement member 1. A cross-sectional shape of the first portion 16a has a substantially rectangular shape, for example. The second portion 16b is a portion for molding the fifth surfaces 122 and 152 of the vehicle reinforcement member 1. The second portion 16b is located on the bottom surface of the cavity 16 from the first portion 16a. A cross-sectional shape of the second portion 16b has a substantially inverted trapezoidal shape, for example.

A surface 12b facing the lower die 11 in the upper die 12 is provided with a protrusion 24 protruding toward the lower die 11. Therefore, a portion of the surface 12b has an uneven surface. More specifically, a portion overlapping the cavity 16 on the surface 12b has an uneven surface. The uneven surface is provided to form the groove 110 of the second surface 102 in the vehicle reinforcement member 1. The protrusion 24 is provided to form the protrusion portions 104a and 104b in the vehicle reinforcement member 1. For example, the protrusion 24 extends along an extending direction of the metal pipe 14. In order to bring the upper die 12 and the lower die 11 into close contact with each other, a portion overlapping the first protrusion 11b or the second protrusion 11c on the surface 12b has a flat surface.

Referring back to FIG. 3, the drive mechanism 80 includes a slide 81 for moving the upper die 12 so that the upper die 12 and the lower die 11 are aligned with each other, a shaft 82 that generates a driving force for moving the slide 81, and a connecting rod 83 for transmitting the driving force generated by the shaft 82 to the slide 81. The shaft 82 has an eccentric crank 82a extending upward of the slide 81 in a rightward-leftward direction, supported to be rotatable, and extending in the rightward-leftward direction after protruding from the right and left ends at a position separated from an axis thereof. The eccentric crank 82a and a rotary shaft 81a provided on the upper portion of the slide 81 and extending in the rightward-leftward direction are connected to each other by the connecting rod 83. Oscillation (rotary motion) of the connecting rod 83 which is generated when a positional change of the eccentric crank 82a is transmitted to the slide 81 is absorbed by the rotary shaft 81a. The shaft 82 is rotated or stopped in accordance with driving of a motor controlled by the control unit 70, for example.

The heating mechanism (power supply unit) 50 includes a power supply source 55 and a power supply line 52 that electrically connects the power supply source 55 and the electrodes 17 and 18. The power supply source 55 includes a DC power supply and a switch, and can energize the metal pipe 14 via the power supply line 52 and the electrodes 17 and 18. In the present embodiment, the power supply line 52 is connected to the lower electrodes 17 and 18. However, a configuration is not limited thereto. The control unit 70 can heat the metal pipe 14 to a quenching temperature (for example, AC3 transformation point temperature or higher) by controlling the heating mechanism 50.

Each of the pair of gas supply sections 40 has a cylinder unit 42 placed and fixed onto the base 15 via a block 41, a cylinder rod 43 that moves forward and rearward in accordance with an operation of the cylinder unit 42, and a gas supply nozzle 44 connected to a tip of the cylinder rod 43. A tapered surface 45 provided to be tapered is provided in a tip of the gas supply nozzle 44. In addition, a gas passage 46 is provided inside the gas supply nozzle 44.

The gas supply unit 60 has a gas source 61, an accumulator 62 for storing the gas supplied by the gas source 61, a first tube 63 extending from the accumulator 62 to the cylinder unit 42 of the gas supply section 40, a pressure control valve 64 and a switching valve 65 which are interposed in the first tube 63, a second tube 67 extending from the accumulator 62 to the gas supply nozzle 44 of the gas supply section 40, and a pressure control valve 68 and a check valve 69 which are interposed in the second tube 67. The pressure control valve 64 has a role to supply gas having an operation pressure adapted to a pushing force of the gas supply nozzle 44 against the metal pipe 14, to the cylinder unit 42. The check valve 69 has a role to prevent the gas from flowing back inside the second tube 67.

The pressure control valve 68 is a valve that adjusts the pressure inside the second tube 67 under the control of the control unit 70. For example, the pressure control valve 68 has a role to supply gas (hereinafter, referred to as low pressure gas) having an operation pressure (hereinafter, referred to as a first ultimate pressure) for temporarily expanding the metal pipe 14 and gas (hereinafter, referred to as high pressure gas) having an operation pressure (hereinafter, referred to as a second ultimate pressure) for molding the metal pipe 14, into the second tube 67. In this manner, the low pressure gas and the high pressure gas can be supplied to the gas supply nozzle 44 connected to the second tube 67. For example, the pressure of the high pressure gas is approximately 2 to 5 times that of the low pressure gas.

In addition, the control unit 70 acquires temperature information from the thermocouple 21 since information is transmitted from (A) illustrated in FIG. 3, and controls the heating mechanism 50 and the drive mechanism 80. The water circulation mechanism 72 includes a water tank 73 that stores the water, a water pump 74 that pumps up the water stored in the water tank 73, pressurizes the water, and feeds the water to the cooling water passage 19 of the lower die 11 and the cooling water passage 25 of the upper die 12, and a pipe 75. Although omitted, a cooling tower for lowering the water temperature and a filter for purifying the water may be interposed in the pipe 75.

Method of Molding Metal Pipe by Using Molding Apparatus

Figure 6A:
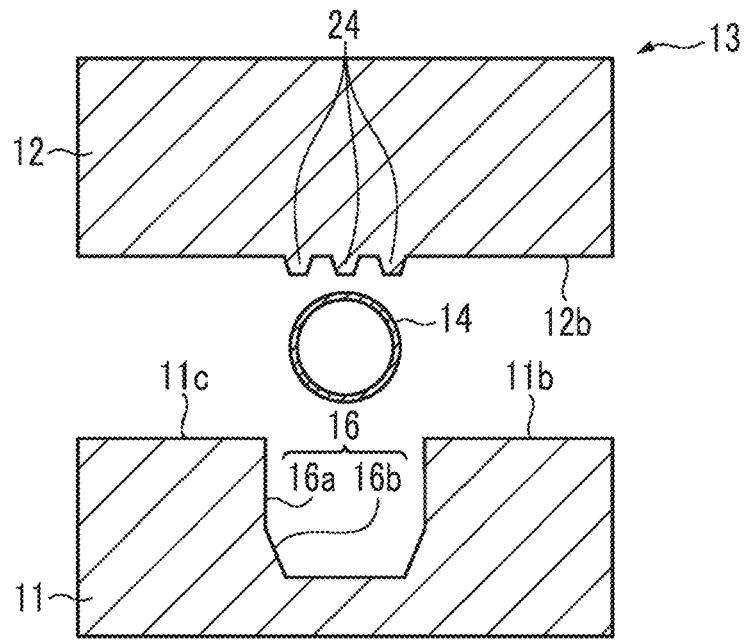
FIGS. 6A to 6C are views illustrating an operation of the molding die and a change in a shape of a metal pipe material.

Next, a method of molding the cylindrical body section 100 by using the molding apparatus 10 will be described with reference to FIGS. 6A to 6C. First, as illustrated in FIG. 6A, the metal pipe 14 is prepared inside the molding apparatus 10. Specifically, the metal pipe 14 is disposed between the upper die 12 and the lower die 11. The metal pipe 14 is pinched by the upper electrodes 17 and 18 and the lower electrodes 17 and 18 of the pipe holding mechanism 30. In addition, the heating mechanism 50 is controlled by the control unit 70 so that the metal pipe 14 is energized and heated. Specifically, the heating mechanism 50 is controlled by the control unit 70 so that the power is supplied to the metal pipe 14. In this case, the power transmitted to the lower electrodes 17 and 18 via the power supply line 52 is supplied to the upper electrodes 17 and 18 and the metal pipe 14 which pinch the metal pipe 14. Then, due to electric resistance of the metal pipe 14 itself, the metal pipe 14 itself generates heat by using Joule heat.

Figure 6B:
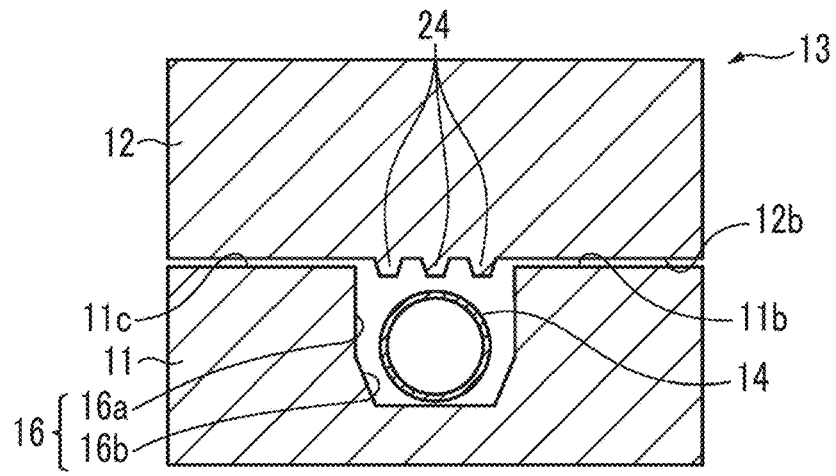

Next, as illustrated in FIG. 6B, the drive mechanism 80 is controlled by the control unit 70 so that the upper die 12 is moved toward the lower die 11. In this manner, the upper die 12 and the lower die 11 are brought close to each other, and a space for molding the cylindrical body section 100 is formed between the upper die 12 and the lower die 11. At this time, the metal pipe 14 disposed between the upper die 12 and the lower die 11 is located inside the cavity 16. The upper die 12 may be brought closer to the lower die 11 side before the metal pipe 14 is energized and heated.

Figure 6C:
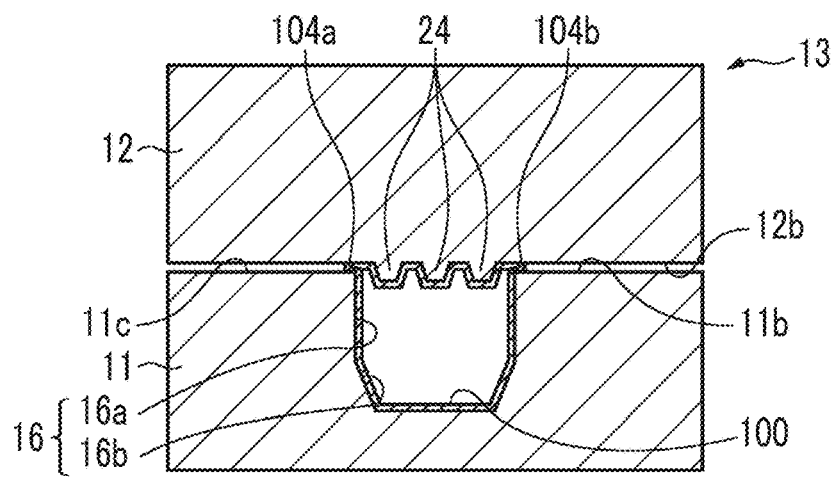

Next, as illustrated in FIG. 6C, the gas is supplied into the metal pipe 14 so that the cylindrical body section 100 having the protrusion portions 104a and 104b is expanded and molded in the space. Specifically, first, the cylinder unit 42 of the gas supply section 40 is operated so that the gas supply nozzle 44 is moved forward and the gas supply nozzle 44 is inserted into both ends of the metal pipe 14. At this time, a tip portion 44A of each gas supply nozzle 44 is inserted into both ends of the metal pipe 14 to seal the tip portion 44A. In this manner, the inside of the metal pipe 14 and the gas passage 46 communicate with each other in a satisfactory airtight manner. Subsequently, the gas supply unit 60, the drive mechanism 80, and an on-off valve 47 are controlled by the control unit 70 to supply the gas (gas) into the heated metal pipe 14. In this manner, the metal pipe 14 softened by the heating expands and comes into contact with the molding die 13. Then, the metal pipe 14 is molded along shapes of the cavity 16, the first protrusion 11b, the second protrusion 11c, and the surface 12b.

A timing and a pressure of the gas to be supplied are adjusted so that a portion of the expanded metal pipe 14 reliably enters each of the portion between the first protrusion 11b and the surface 12b and the portion between the second protrusion 11c and the surface 12b. In this manner, the cylindrical body section 100 having the protrusion portions 104a and 104b can be satisfactorily molded. A time from blow forming of the metal pipe 14 to molding completion of the vehicle reinforcement member 1 is approximately several seconds to several tens of seconds, although the time depends on a type of the metal pipe 14.

The outer peripheral surface of the blow-formed and bulging metal pipe 14 is rapidly cooled by coming into contact with the cavity 16 of the lower die 11, and at the same time, the outer peripheral surface is rapidly cooled by coming into contact with the surface 12b of the upper die 12. In this manner, the metal pipe 14 is hardened. The upper die 12 and the lower die 11 have large heat capacity, and are controlled at a low temperature. Therefore, the metal pipe 14 comes into contact with the upper die 12 and the lower die 11 so that the heat of the pipe surface is rapidly transferred to the die side. This cooling method is called die contact cooling or die cooling. Immediately after being rapidly cooled, austenite transforms into martensite (hereinafter, transformation of the austenite to the martensite is referred to as martensite transformation). In the latter half of the cooling, a cooling rate is lowered. Accordingly, the martensite transforms into another structure (troustite or sorbite) due to recuperation. Therefore, it is not necessary to perform a separate tempering process. In addition, in the present embodiment, cooling may be performed by supplying a cooling medium into the cavity 16, for example, instead of the die cooling or in addition to the die cooling. For example, the metal pipe 14 may be brought into contact with the dies (upper die 12 and lower die 11), and may be cooled to reach a temperature at which the martensite transformation starts. Thereafter, the dies may be opened, and a cooling medium (cooling gas) may be blown to the metal pipe 14. In this manner, the martensite transformation may occur.

Operational Effect

Next, an operational effect of the vehicle reinforcement member 1 will be described with reference to the following comparative example. A reinforcement member according to the comparative example has a configuration the same as that of the vehicle reinforcement member 1 according to the present embodiment except that reinforcement member does not include the protrusion portion.

Figure 7A:
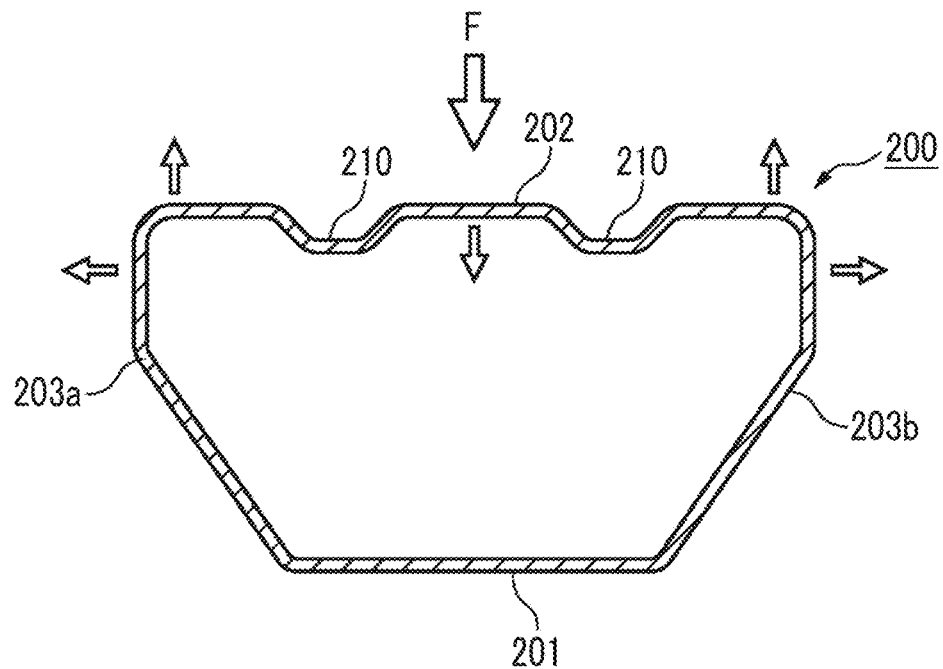
FIGS. 7A to 7C are views illustrating deformation caused by a load of a reinforcement member according to a comparative example.
Figure 7B:
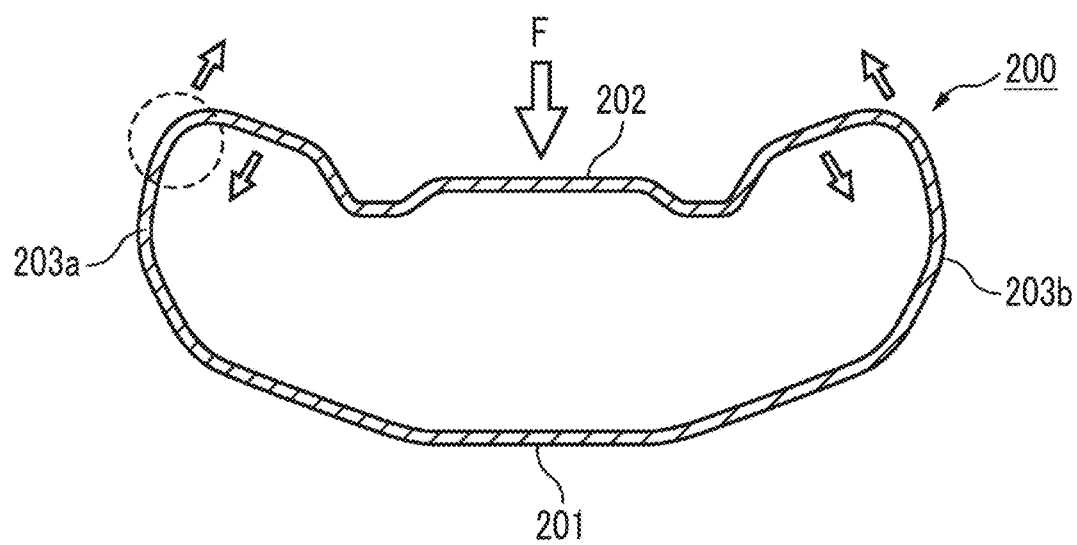
Figure 7C:
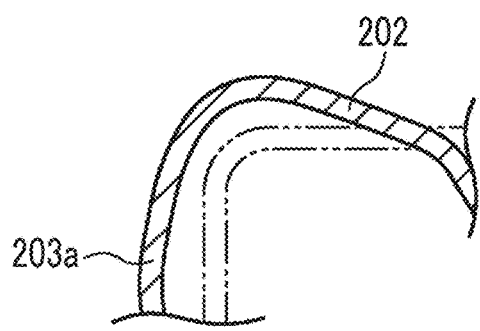

FIGS. 7A to 7C are views illustrating deformation caused by a load of the reinforcement member according to the comparative example. FIG. 7C is an enlarged view of a portion illustrated by a broken line in FIG. 7B. The portion illustrated by the virtual line in FIG. 7C illustrates the reinforcement member before deformation. Each arrow illustrated in FIGS. 7A and 7B indicates a direction in which the reinforcement member is deformed with the application of the load F. FIG. 7A illustrates a reinforcement member 200 having a first surface 201, a second surface 202 facing the first surface 201 and having a groove portion 210 formed thereon, and third surfaces 203a and 203b connecting the first surface 201 and the second surface 202 to each other. When the load F is applied to the reinforcement member 200 from the second surface 202 side, the reinforcement member 200 deforms as illustrated in FIG. 7B. In particular, the portion located in the vicinity of the second surface 202 on the third surfaces 203a and 203b is displaced further outward than before the deformation, as illustrated in FIG. 7C. Therefore, the third surfaces 203a and 203b tend to easily deform without receiving the load F. Therefore, according to the reinforcement member 200 of the comparative example, there is a tendency that sufficient shock resistance against the applied load F cannot be achieved.

Figure 8A:
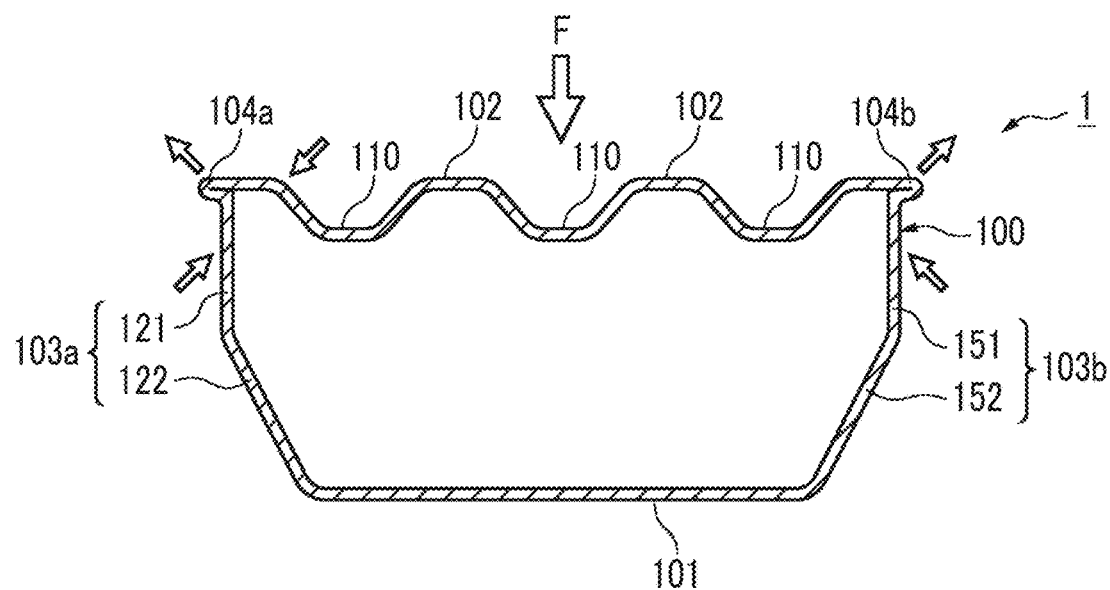
FIGS. 8A to 8C are views illustrating deformation caused by a load of the reinforcement member for the vehicle.
Figure 8B:
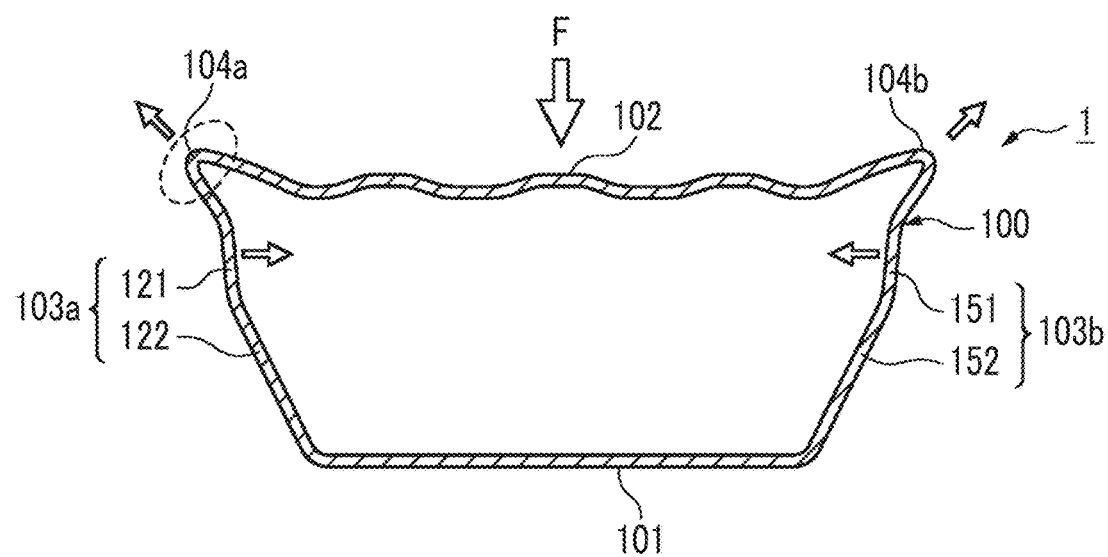
Figure 8C:
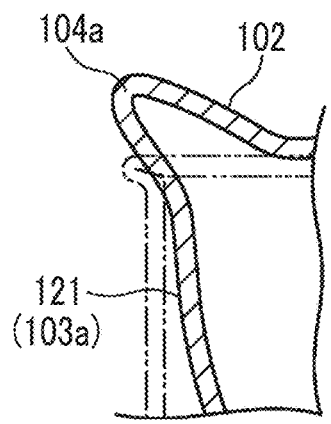

FIGS. 8A to 8C are views illustrating deformation caused by a load of the vehicle reinforcement member 1 according to the present embodiment. FIG. 8C is an enlarged view of a portion illustrated by a broken line in FIG. 8B. The portion illustrated by a virtual line in FIG. 8C indicates the vehicle reinforcement member 1 before deformation. Each arrow illustrated in FIGS. 8A and 8B indicates a direction in which the vehicle reinforcement member 1 deforms due to a load F applied thereto. When the load F is applied to the vehicle reinforcement member 1 according to the present embodiment from the second surface 102 side, the vehicle reinforcement member 1 deforms as illustrated in FIG. 8B. Here, as illustrated in FIG. 8C, the fourth surfaces 121 and 151 of the third surfaces 103a and 103b are displaced further inward than before the deformation, unlike the above-described comparative example. Therefore, the third surfaces 103a and 103b tend to continuously receive the load F even when both of these deform. Therefore, the vehicle reinforcement member 1 according to the present embodiment tends to have more excellent shock resistance than the reinforcement member 200 according to the above comparative example.

In addition, the vehicle reinforcement member 1 molded by the manufacturing method according to the present embodiment includes the cylindrical body section 100 having a continuously closed cross section. Therefore, even when a shock is applied to the vehicle reinforcement member 1, the cylindrical body section 100 is prevented from being divided into one part and the other part. In addition, the cylindrical body section 100 has no location divided in advance. Therefore, apart having poor shock resistance is unlikely to be formed in the cylindrical body section 100. Furthermore, the third surface 103a has the fourth surface 121 extending from the end portion 131 to be away from the second surface 102, and the third surface 103b has the fourth surface 151 extending from the end portion 161 to be away from the second surface 102. In this manner, inward deformation of the third surfaces 103a and 103b is less likely to be hindered by the second surface 102. Therefore, when a shock is applied to the vehicle reinforcement member 1 from the second surface 102 side, shock absorption is satisfactorily achieved by the third surfaces 103a and 103b. Therefore, according to the vehicle reinforcement member 1, satisfactory shock absorption can be achieved.

The protrusion amount P1 of the protrusion portions 104a and 104b located in the central portion 100a of the cylindrical body section 100 in the longitudinal direction may be from 1 mm to 5 mm. Even in this case, when a shock is applied to the vehicle reinforcement member 1 from the second surface 102 side, the protrusion portions 104a and 104b of the central portion 100a deform outward. Therefore, even in the central portion 100a, the shock absorption can be satisfactorily achieved by the third surfaces 103a and 103b. In addition, it is possible to compatibly realize both suppression of strength degradation and weight reduction of the cylindrical body section 100.

The protrusion amount P2 of the protrusion portions 104a and 104b located in the end portions 100b and 100c of the cylindrical body section 100 in the longitudinal direction may be 10 mm or larger. In this case, the protrusion portions 104a and 104b located in the end portions 100b and 100c can be used as locations to be welded to another member.

Figure 9A:
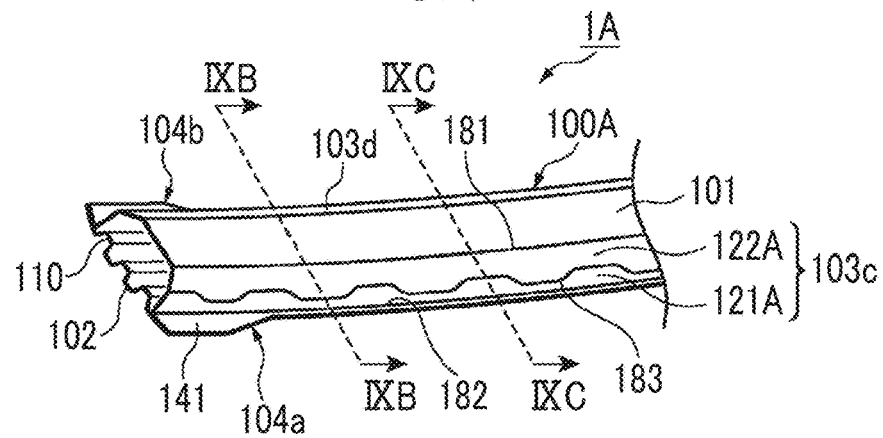
FIG. 9A is a schematic perspective view illustrating a part of the vehicle reinforcement member.
Figure 9B:
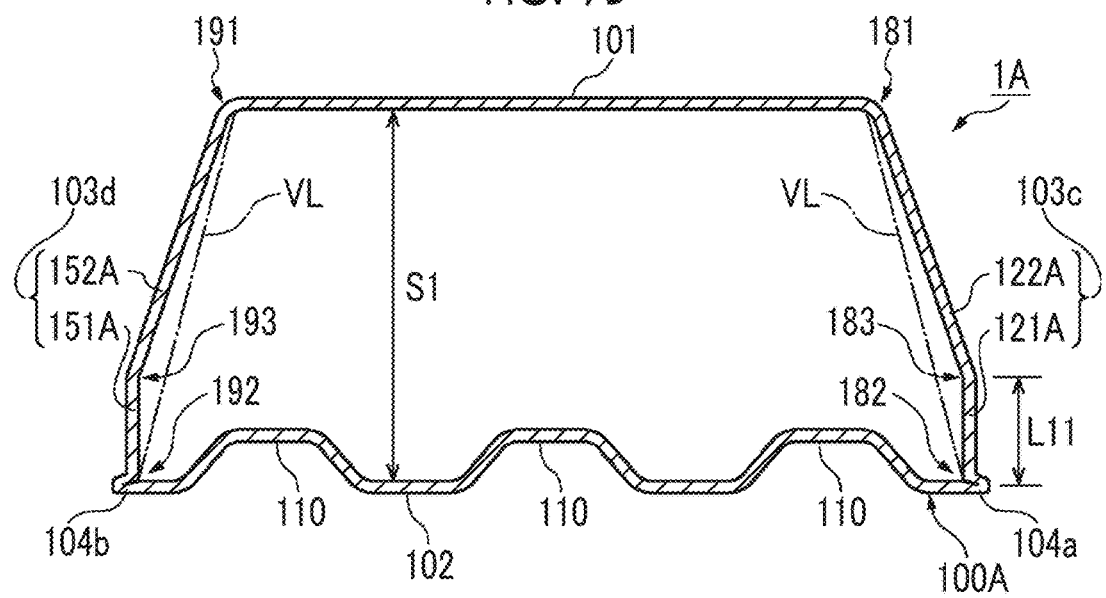
FIG. 9B is a sectional view taken along line IXB-IXB in FIG. 9A.
Figure 9C:
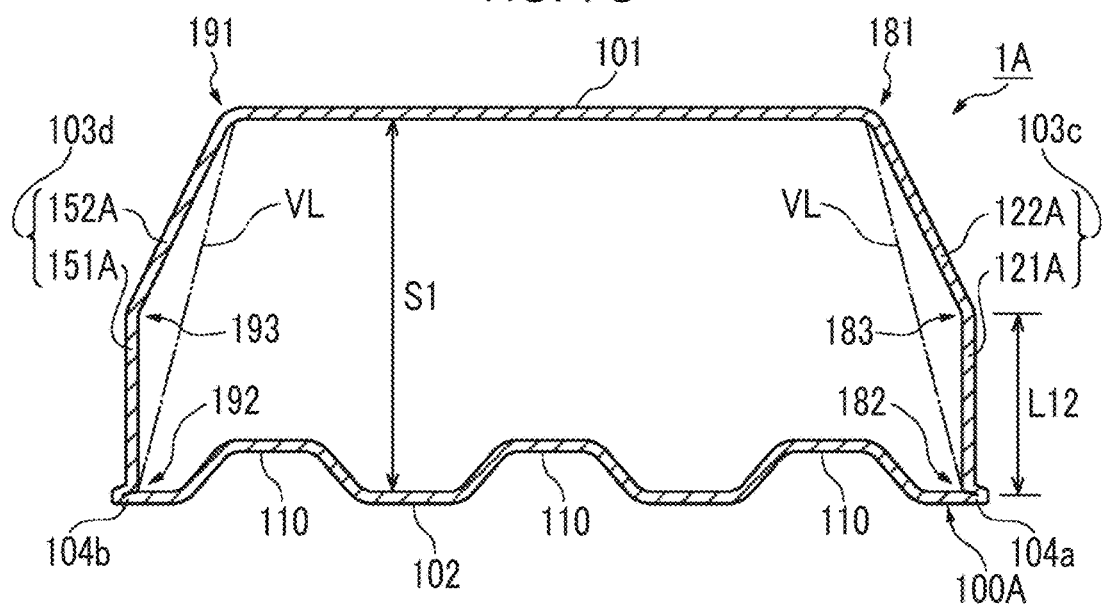
FIG. 9C is a sectional view taken along line IXC-IXC in FIG. 9A.

Next, another vehicle reinforcement member will be described with reference to FIGS. 9A to 9C. In the description of another vehicle reinforcement member, repeated description of the above-described embodiment will be omitted, and portions different from those of the above-described embodiment will be described. FIG. 9A is a schematic perspective view illustrating a part of another vehicle reinforcement member. FIG. 9B is a sectional view taken along line IXB-IXB in FIG. 9A. FIG. 9C is a sectional view taken along line IXC-IXC in FIG. 9A.

A cylindrical body section 100A of a vehicle reinforcement member 1A illustrated in FIGS. 9A to 9C has third surfaces 103c and 103d. A length of a fourth surface 121A of the third surface 103c in the facing direction periodically varies along the longitudinal direction. For example, a length L11 of the fourth surface 121A in a cross section (first cross section) illustrated in FIG. 9B is shortest, and a length L12 of the fourth surface 121A in a cross section (second cross section) illustrated in FIG. 9C is longest. For example, the length L11 is from 20% to 35% of the distance S1, and the length L12 is from 40% to 60% of the distance S1. Similarly, the length of the fourth surface 151A of the third surface 103d in the facing direction periodically varies along the longitudinal direction. The lengths of the fourth surfaces 121A and 151A in the cross section are substantially the same as each other.

According to this configuration, an operational effect the same as that of the form of FIG. 1 is obtained. In addition, the lengths of the fourth surfaces 121A and 151A are adjusted along the longitudinal direction. Therefore, it is possible to set the shock resistance according to a position of the vehicle reinforcement member 1A. Furthermore, the length of the fourth surface 121A of the third surface 103c and the length of the fourth surface 151A of the third surface 103d in the facing direction periodically vary along the longitudinal direction. Therefore, it is possible to improve a maximum reaction force value of the vehicle reinforcement member 1A with respect to the load applied from the second surface 102 side.

Here, as illustrated in FIGS. 9B and 9C, in a sectional view when viewed in the longitudinal direction, portions where the first surface 101 and the third surfaces 103c and 103d intersect with each other are set as first intersection portions 181 and 191. Portions where the second surface 102 and the third surfaces 103c and 103d intersect with each other are set as second intersection portions 182 and 192. Portions where the fourth surfaces 121A and 151A and the fifth surfaces 122A and 152A intersect with each other are set as third intersection portions 183 and 193. At this time, a virtual line VL connecting the first intersection portions 181 and 191 and the second intersection portions 182 and 192 to each other is set. At this time, the third intersection portions 183 and 193 protrude outward with respect to the virtual line VL. Outward described here means outward when viewed from the internal space. That is, each cross-sectional shape of the third surfaces 103c and 103d is a shape bulging outward with respect to the virtual line VL.

An example of a method of setting the virtual line VL and a method of comparing the virtual line VL with the third intersection portions 183 and 193 will be described with reference to FIGS. 11A, 11B, and 11C. In the following description, only a configuration on the third surface 103d side will be described. However, the same description is applicable to the third surface 103c. As illustrated in FIG. 11A, a reference point SP1 serving as an end portion of the virtual line VL may be set at a location where an inner surface of the first surface 101 and an inner surface of the third surface 103d intersect with each other. Here, when a corner portion is curved, the reference point SP1 may be set at a center position in the circumferential direction of an arc.

As illustrated in FIG. 11B, when the virtual line VL and the third intersection portion 193 are compared with each other, a reference point SP3 may be set at a location where the inner surface of the fourth surface 151A and the inner surface of the fifth surface 152A intersect with each other. Then, the reference point SP3 may be located outside the virtual line VL. Here, when the corner portion is curved, the reference point SP3 may be set at the center position in the circumferential direction of the arc.

As illustrated in FIG. 11C, a reference point SP2 serving as an end portion of the virtual line VL may be set at a location where the inner surface of the second surface 102 and the inner surface of the third surface 103d intersect with each other. However, when the protrusion portion 104b is formed between the second surface 102 and the third surface 103d, it may be considered that the protrusion portion 104b belongs to the third surface 103d in a case where the virtual line VL is set. Therefore, the reference point SP2 may be set at a location where the inner surface of a folded-back portion 114 of the protrusion portion 104b and the inner surface of the fourth surface 151A intersect with each other. When the corner portion is curved, the reference point SP2 may be set at the center position in the circumferential direction of the arc.

In the drawing, the inner surface of the folded-back portion 114 of the protrusion portion 104b is in contact with a facing location of the inner surface of the second surface 102, and the protrusion portion 104b has a crushed shape. However, both the inner surfaces may be separated from each other to form a space inside the protrusion portion 104b. Even in this case, the reference point SP2 may be set at a location where the inner surface of the folded-back portion 114 of the protrusion portion 104b and the inner surface of the fourth surface 151A intersect with each other.

As illustrated in FIG. 11D, the cylindrical body section 100A has variable portions 196 and 197 (changing portions) in which a position of the third intersection portion 193 in the facing direction varies along the longitudinal direction. Hereinafter, when a term of the "position of the third intersection portion" is used, it means the position of the third intersection portion in the facing direction. The "variable portion" is a portion where the position of the third intersection portion slowly, that is, gradually varies along the longitudinal direction.

The cylindrical body section 100A has a variable portion 196 and a variable portion 197, as the variable portion. In the variable portion 196, the position of the third intersection portion 193 varies from the first surface 101 side to the second surface 102 side, as the variable portion 196 is oriented toward one side in the longitudinal direction (here, from the right side to the left side in FIG. 11D). In the variable portion 197, the position of the third intersection portion 193 varies from the second surface 102 side to the first surface 101 side, as the variable portion 197 is oriented toward one side in the longitudinal direction.

When a direction from the right side to the left side in FIG. 11D is defined as "one side in the longitudinal direction" in the appended claims, the variable portion 196 corresponds to a "first changing portion", and the variable portion 197 corresponds to a "second changing portion". However, when a direction from the left side to the right side in FIG. 11D is defined as "one side in the longitudinal direction" in the appended claims, the variable portion 197 corresponds to the "first changing portion", and the variable portion 196 corresponds to the "second changing section".

In at least a portion of the cylindrical body section 100A in the longitudinal direction, the variable portion 196 and the variable portion 197 are alternately formed along the longitudinal direction in a predetermined pattern having repeated shapes.

In addition, the cylindrical body section 100A has non-changing portions 198 and 199 in which the position of the third intersection portion 193 is constant along the longitudinal direction, between the variable portion 196 and the variable portion 197. The non-changing portion 198 has a constant cross section at a location where the position of the third intersection portion 193 is close to the second surface 102. A cross-sectional shape of the non-changing portion 198 is a shape illustrated in FIG. 9B. The non-changing portion 199 has a constant cross section at a location where the position of the third intersection portion 193 is far from the second surface 102. A cross-sectional shape of the non-changing portion 199 is a shape illustrated in FIG. 9C.

Sequentially from the right side to the left side in FIG. 11D, a pattern having repeated shapes of "the non-changing portion 198, the variable portion 197, the non-changing portion 199, the variable portion 196, the non-changing portion 198, and so forth" is formed.

An operational effect of a form illustrated in FIG. 9A to 9C will be described.

In a sectional view when viewed in the longitudinal direction, in a case where the virtual line VL connecting the first intersection portions 181 and 191 where the first surface 101 and the third surfaces 103c and 103d intersect with each other and the second intersection portions 182 and 192 where the second surface 102 and the third surfaces 103c and 103d intersect with each other is set, the third intersection portions 183 and 193 where the fourth surfaces 121A and 151A and the fifth surfaces 122A and 152A intersect with each other protrude outward with respect to the virtual line VL. In this cross-sectional shape, the cylindrical body section 100A has the variable portions 196 and 197 where the positions of the third intersection portions 183 and 193 vary along the longitudinal direction in the facing direction in which the first surface 101 and the second surface 102 face each other.

In this case, the cylindrical body section 100A has a plurality of locations where the positions of the third intersection portions 183 and 193 are different from each other in the facing direction. That is, the cylindrical body section 100A has a location having a cross-sectional shape illustrated in FIG. 9B (here, the non-changing portion 198) and a location having a cross-sectional shape illustrated in FIG. 9C (here, the non-changing portion 199). When a shock is applied to the second surface 102, the locations deform in mutually different deformation modes in a sectional view.

For example, the location having the cross-sectional shape illustrated in FIG. 9C can vary to have a shape in which the third surfaces 103c and 103d bulge further outward. On the other hand, the location having the cross-sectional shape illustrated in FIG. 9B can vary to have a shape in which the third surfaces 103c and 103d enter inward (for example, a shape in which the third intersection portion 193 enters inward from the virtual line VL). Alternatively, even when the location having the cross-sectional shape illustrated in FIG. 9B varies so that the third surfaces 103c and 103d bulge outward, a bulging amount thereof is smaller than that in FIG. 9C.

In this way, the cylindrical body section 100A in which the locations having the mutually different deformation modes are present in the longitudinal direction, crushing of the cross section can be suppressed, and load resistant performance can be improved, compared to a case where the locations have a constant deformation mode in the longitudinal direction. Therefore, according to the vehicle reinforcement member, satisfactory shock absorption can be achieved.

For example, an input to the cylindrical body section 100A starts from the most protruding location in the longitudinal direction. For example, in an example illustrated in FIG. 11 D, the non-changing portion 198 on the right side in the drawing starts to be crushed. Subsequently, the non-changing portion 199 adjacent thereto on the left side is crushed via the variable portion 197. Then, the non-changing portion 198 adjacent thereto on the further left side is crushed via the variable portion 196. In this way, as the cylindrical body section 100A is progressively crushed, the deformation mode of the cross-sectional shape alternately and repeatedly varies between the non-changing portion 198 and the non-changing portion 199. In this case, the progressive crushing of the cross-sectional shape receives resistance each time the deformation mode varies. Therefore, the crushing of the cylindrical body section 100A is suppressed.

In contrast, when the cross-sectional shape is constant in the longitudinal direction as in the form in FIG. 1, the deformation mode is also substantially constant in the longitudinal direction. In this case, when the crushing starts from a load input location of the cylindrical body section 100A, locations subsequent thereto are also progressively crushed in the same deformation mode. In this way, according to the form in FIG. 1, the resistance decreases during the progressive crushing of the cylindrical body section, compared to the form illustrated in FIG. 9A to 9C.

As the changing portion, the cylindrical body section 100A has the variable portion 196 in which the positions of the third intersection portions 183 and 193 vary from the first surface 101 side to the second surface 102 side, as the cylindrical body section 100A is oriented to one side in the longitudinal direction, and the variable portion 197 in which the position of the third intersection portion 193 varies from the second surface 102 side to the first surface 101 side, as the cylindrical body section 100A is oriented to one side in the longitudinal direction. In this case, it is possible to form three or more locations having the mutually different deformation modes in the longitudinal direction. That is, as the changing portion, a structure may be adopted so that the changing portion is formed in only one location (only either the variable portion 196 or the variable portion 197) in the entire length of the cylindrical body section. However, a structure having both the variable portion 196 and the variable portion 197 can further improve load resistant performance.

In at least a portion of the cylindrical body section 100A in the longitudinal direction, the variable portion 196 and the variable portion 197 are alternately formed along the longitudinal direction in a predetermined pattern having repeated shapes. In this case, in the cylindrical body section 100A, a location where the position of the third intersection portion 193 is close to the second surface 102 and a location where the position of the third intersection portion 193 is far from the second surface 102 are alternately formed. In this case, the load resistant performance of the cylindrical body section 100A can be further improved.

The cylindrical body section 100 has the non-changing portions 198 and 199 where the position of the third intersection portion 193 is constant along the longitudinal direction, between the variable portion 196 and the variable portion 197. In this case, the location where the position of the third intersection portion 193 is close to the second surface 102 and the location where the position of the third intersection portion 193 is far from the second surface 102 are configured to be continuous in a constant cross section. In this case, the length of the constant cross section is adjusted to easily adjust the load resistant performance of the cylindrical body section 100A. For example, when the load resistant performance of the cylindrical body section 100A needs to be adjusted only by optimizing the shapes of the variable portions 196 and 197, a simulation load increases at the time of design. In contrast, the non-changing portion is also partially provided. Accordingly, the load resistant performance can also be adjusted by adjusting the length of the non-changing portion. In this manner, the simulation load can decrease at the time of design.

The shape pattern of the third intersection portion 193 is not limited to that illustrated in FIG. 11D. For example, a vehicle reinforcement member 1B having a shape pattern as illustrated in FIG. 12 may be adopted. The shape pattern does not have the non-changing portion 199, and is immediately shifted from the variable portion 197 to the variable portion 196 via a top portion 195. A cross-sectional shape in FIG. 9C is a cross-sectional shape of the top portion 195. In addition, any shape pattern may be adopted.

As the changing portion, the variable portion gradually curved as illustrated in FIG. 11D is adopted. However, the shape of the changing portion is not particularly limited. For example, the changing portion may have a linear shape obliquely extending straight. In addition, the changing portion may have a shape so that a plurality of oblique straight lines are combined with each other.

The shape pattern having the changing portion may be formed over the entire length of the cylindrical body section. However, the shape pattern may be only partially formed.

Figure 10:
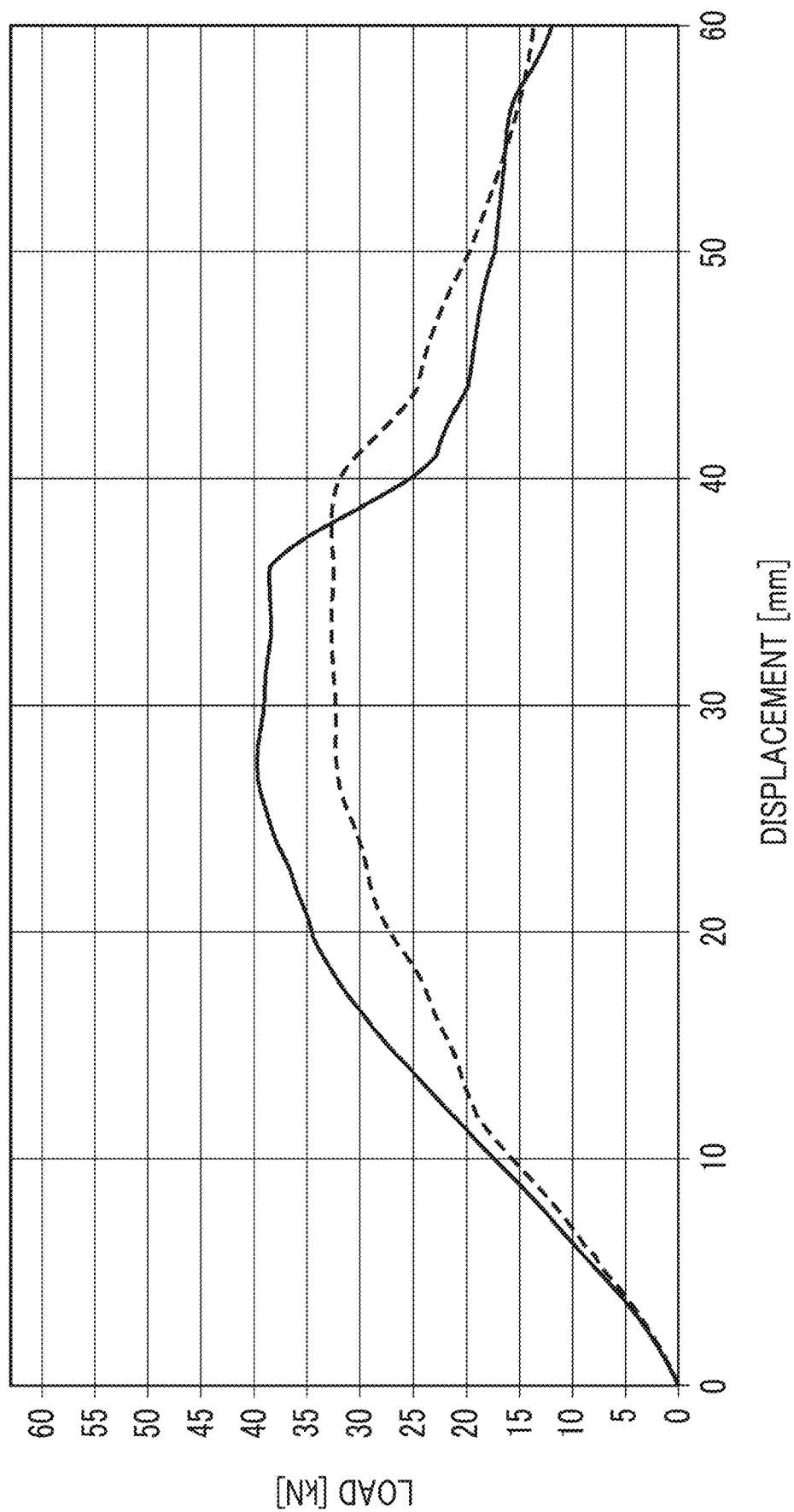
FIG. 10 is a view illustrating a load displacement curve of the reinforcement member for the vehicle according to a form illustrated in FIG. 1 and a form illustrated in FIG. 9A to 9C.

FIG. 10 is a view illustrating a load displacement curve of the vehicle reinforcement member according to the form in FIG. 1 and the form in FIG. 9A to 9C. In FIG. 10, a vertical axis represents a load, and a horizontal axis represents displacement. A broken line graph indicates the load displacement curve of the vehicle reinforcement member according to the form in FIG. 1, and a solid line graph indicates the load displacement curve of the vehicle reinforcement member according to the form in FIG. 9A to 9C. The load displacement curves are obtained by carrying out a three-point bending test. The three-point bending test is carried out under the same condition by using samples set to have the same shape and dimensions except for the shape of the third surface. The two samples are obtained by performing a molding process on a metal pipe formed of ultra-high strength steel having tensile strength of 1.5 GPa and a plate thickness of 1.2 mm.

As illustrated in FIG. 10, a test result shows that a load resistant characteristic of the form in FIG. 9A to 9C is more satisfactory than a load resistant characteristic of the form in FIG. 1 when the displacement is approximately 0 mm to 35 mm. In addition, the maximum reaction force value in the form in FIG. 9A to 9C is greater than that of the form in FIG. 1. In addition, in both the form in FIG. 1 and the form in FIG. 9A to 9C, the load exceeds 30 kN when the displacement is 30 mm to 35 mm.

In addition, the above-described three-point bending test is also carried out for a flange-provided reinforcement member obtained by cold working and welding of two ultra-high strength steels having the tensile strength of 1.8 GPa and the plate thickness from 1.25 mm to 1.6 mm. As a result, in the reinforcement member, the load is lower than 30 kN when the displacement is 30 mm to 35 mm. Based on this result, it is understood that each of the vehicle reinforcement members 1 and 1A according to the form in FIG. 1 and the form in FIG. 9A to 9C tends to have more excellent shock resistance than the above-described reinforcement member. In particular, in each of the vehicle reinforcement members 1 and 1A, the above-described result can be obtained even though the tensile strength is poor than that of the above-described reinforcement member and the vehicle reinforcement members 1 and 1A are formed of a thin plate material.

Hitherto, preferable embodiments of the present invention have been described. However, the present invention is not limited to the above-described embodiments. For example, the protrusion amount of the protrusion portion of the vehicle reinforcement member in the above-described form may be constant. In addition, in the above-described form, the protrusion portion protrudes along the transverse direction. However, the present invention is not limited thereto. The protrusion portion may protrude along the facing direction.

First Form

There is provided a vehicle reinforcement member which includes a cylindrical body section having a continuously closed cross section intersecting with a longitudinal direction.

The cylindrical body section has a first surface located inside a vehicle when mounted on the vehicle, a second surface separated from and facing the first surface, a third surface connecting the first surface and the second surface to each other, and a protrusion portion formed by folding a portion of the cylindrical body section including a first end portion of the second surface and a second end portion of the third surface.

The third surface has a fourth surface extending from the second end portion to be away from the second surface, and a fifth surface connecting the fourth surface and the first surface to each other.

Second Form

In the vehicle reinforcement member according to the first form, a protrusion amount of the protrusion portion located in a central portion of the cylindrical body section in the longitudinal direction is from 1 mm to 5 mm.

Third Form

In the vehicle reinforcement member according to the second form, the protrusion amount of the protrusion portion located in an end portion of the cylindrical body section in the longitudinal direction is 10 mm or larger.

Fourth Form

In the vehicle reinforcement member according to any one of the first to third forms, in the cylindrical body section, a shape of the third surface in a first cross section intersecting with the longitudinal direction and a shape of the third surface in a second cross section intersecting with the longitudinal direction and different from each other.

Fifth Form

In the vehicle reinforcement member according to the fourth form, a length of the fourth surface in a facing direction of the first surface and the second surface periodically varies along the longitudinal direction.

Sixth Form

There is provided a method for manufacturing the vehicle reinforcement member according to any one of the first to fifth forms.

The method includes a process of preparing a metal pipe between a first die and a second die, a process of forming a space for molding the cylindrical body section having the protrusion portion between the first die and the second die by moving at least one of the first die and the second die in a direction in which the dies join to each other, and a process of molding the cylindrical body section in the space by supplying gas into the metal pipe which is heated.

According to one aspect of the present invention, there is provided a vehicle reinforcement member including a cylindrical body section having a continuously closed cross section intersecting with a longitudinal direction. The cylindrical body section has a first surface located inside a vehicle, a second surface separated from and facing the first surface, a third surface connecting the first surface and the second surface to each other, and a protrusion portion formed by folding a portion of the cylindrical section including a first end portion of the second surface and a second end portion of the third surface. The third surface has a fourth surface extending from the second end portion to be away from the second surface, and a fifth surface connecting the fourth surface and the first surface to each other.

The reinforcement member for a vehicle includes a cylindrical body section having the continuously closed cross section. Therefore, even when a shock is applied to the reinforcement member for the vehicle, the cylindrical body section is prevented from being divided into one part and the other part. In addition, the cylindrical body section has no location divided in advance. Therefore, a part having poor shock resistance is unlikely to be formed in the cylindrical body section. In addition, the cylindrical body section has the protrusion portion formed by folding a portion of the cylindrical body section including the first end portion of the second surface and the second end portion of the third surface. Therefore, when a shock is applied to the vehicle reinforcement member from the second surface side, the third surface deforms inward as the protrusion portion deforms outward. Here, the third surface has the fourth surface extending from the second end portion s to be away from the second surface. In this manner, the inward deformation of the third surface is less likely to be hindered by the second surface. Therefore, when a shock is applied to the vehicle reinforcement member from the second surface side, the shock absorption is satisfactorily achieved by the third surface. Therefore, according to the vehicle reinforcement member, satisfactory shock absorption can be achieved.

The protrusion amount of the protrusion portion located in the central portion of the cylindrical body section in the longitudinal direction may be from 1 mm to 5 mm. Even in this case, when a shock is applied to the vehicle reinforcement member from the second surface side, the protrusion portion in the central portion deforms outward. Therefore, even in the central portion, the shock absorption is satisfactorily achieved by the third surface. In addition, it is possible to compatibly realize both suppression of strength degradation and weight reduction of the cylindrical body section.

The protrusion amount of the protrusion portion located in the end portion of the cylindrical body section in the longitudinal direction may be 10 mm or larger. In this case, the protrusion portion located in the end portion can be used as the location to be welded to another member.

In the cylindrical body section, a shape of the third surface in a first cross section intersecting with the longitudinal direction and a shape of the third surface in a second cross section intersecting with the longitudinal direction and different from the first cross section may be different from each other. In this case, the shock resistance can be set according to a position of the vehicle reinforcement member.

The length of the fourth surface in the facing direction of the first surface and the second surface may periodically vary along the longitudinal direction. In this case, it is possible to improve the maximum reaction force value of the vehicle reinforcement member.

A method for manufacturing the vehicle reinforcement member for a vehicle includes a process of preparing a metal pipe between a first die and a second die, a process of forming a space for molding the cylindrical body section having the protrusion portion between the first die and the second die by moving at least one of the first die and the second die in a direction in which the dies join to each other, and a process of molding the cylindrical body section in the space by supplying gas into the metal pipe which is heated.

According to the method for manufacturing the reinforcement member for the vehicle, the cylindrical body section is molded using the metal pipe. Therefore, the cylindrical body section having the continuously closed cross section which does not include divided parts is provided. Therefore, even when a shock is applied to the reinforcement member for the vehicle, the cylindrical body section is prevented from being divided into one part and the other part. In addition, a part having poor shock resistance is unlikely to be formed in the cylindrical body section. Therefore, according to the above-described manufacturing method, it is possible to manufacture a reinforcement member for a vehicle, in which satisfactory shock absorption is achieved.

It should be understood that the invention is not limited to the above-described embodiment, but may be modified into various forms on the basis of the spirit of the invention. Additionally, the modifications are included in the scope of the invention.

What is claimed is:

1. A reinforcement member for a vehicle, comprising:
a cylindrical body section having a continuously closed cross section intersecting with a longitudinal direction,
wherein the cylindrical body section comprises:
a first surface located inside a vehicle when mounted on the vehicle,
a second surface separated from and facing the first surface, and
a third surface connecting the first surface and the second surface to each other,
the third surface comprises a fourth surface extending away from the second surface, and a fifth surface connecting the fourth surface and the first surface to each other,
in a sectional view when viewed in the longitudinal direction,
in a case where a virtual line connecting a first intersection portion where the first surface and the third surface intersect with each other and a second intersection portion where the second surface and the third surface intersect with each other is set, a third intersection portion where the fourth surface and the fifth surface intersect with each other protrudes outward with respect to the virtual line,
the cylindrical body section comprises a changing portion where a position of the third intersection portion in a mutually facing direction of the first surface and the second surface is changed along the longitudinal direction,
as the changing portion, the cylindrical body section comprises:
a first changing portion where the position of the third intersection portion is changed from the first surface side to the second surface side, toward one side in the longitudinal direction, and
a second changing portion where the position of the third intersection portion is changed from the second surface side to the first surface side, toward the one side in the longitudinal direction, and
in at least a portion of the cylindrical body section in the longitudinal direction, the first changing portion and the second changing portion are alternately formed along the longitudinal direction in a predetermined pattern having repeated shapes.

2. The reinforcement member for a vehicle according to claim 1,
wherein between the first changing portion and the second changing portion, the cylindrical body section comprises a non-changing portion where the position of the third intersection portion is constant along the longitudinal direction.

3. The reinforcement member for a vehicle according to claim 1,
wherein the first surface has a substantially flat plate shape, and
each of the first surface and the second surface is formed to draw a substantially arc shape.

4. The reinforcement member for a vehicle according to claim 3,
wherein in a transverse direction perpendicular to the longitudinal direction, a width of the second surface is larger than a width of the first surface.

5. The reinforcement member for a vehicle according to claim 3,
wherein the second surface is provided with a plurality of grooves which are separated from each other,
the groove is a portion extending along the longitudinal direction, and recessed toward the first surface from the second surface, and
a cross section intersecting with the longitudinal direction of the groove has a substantially trapezoidal shape.

6. The reinforcement member for a vehicle according to claim 5,
wherein the groove comprises a bottom surface and two side surfaces, and
one side surface is an inclined surface inclined to be closer to the other side surface as the one side surface is closer to the bottom surface.

7. The reinforcement member for a vehicle according to claim 6,
wherein a depth of the groove is approximately 5% to 25% of a distance between the first surface and the second surface in the facing direction.

8. The reinforcement member for a vehicle according to claim 6,
wherein a width of the groove is approximately 10% to 30% of a width of the second surface.

9. A reinforcement member for a vehicle, comprising:
a cylindrical body section having a continuously closed cross section intersecting with a longitudinal direction,
wherein the cylindrical body section comprises:
a first surface located inside a vehicle when mounted on the vehicle,
a second surface separated from and facing the first surface, and
a third surface connecting the first surface and the second surface to each other,
the third surface comprises a fourth surface extending away from the second surface, and a fifth surface connecting the fourth surface and the first surface to each other,
in a sectional view when viewed in the longitudinal direction,
in a case where a virtual line connecting a first intersection portion where the first surface and the third surface intersect with each other and a second intersection portion where the second surface and the third surface intersect with each other is set, a third intersection portion where the fourth surface and the fifth surface intersect with each other protrudes outward with respect to the virtual line, and
the cylindrical body section comprises a changing portion where a position of the third intersection portion in a mutually facing direction of the first surface and the second surface is changed along the longitudinal direction,
the first surface has a substantially flat plate shape, and each of the first surface and the second surface is formed to draw a substantially arc shape,
the second surface is provided with a plurality of grooves which are separated from each other, the groove is a portion extending along the longitudinal direction, and recessed toward the first surface from the second surface, and a cross section intersecting with the longitudinal direction of the groove has a substantially trapezoidal shape,
the cylindrical body section further comprises a protrusion portion, and
the protrusion portion is formed by folding the portion including an end portion of the second surface and an end portion of the third surface in the cylindrical body section, and protrudes in a transverse direction perpendicular to the longitudinal direction.

10. The reinforcement member for a vehicle according to claim 9,
wherein a diameter of an inscribed circle in contact with an inner peripheral surface of the second surface, an inner peripheral surface of the fourth surface, and the side surface of the groove closest to the fourth surface is larger than a protrusion amount of the protrusion portion.

11. The reinforcement member for a vehicle according to claim 9,
wherein a distance between an inner peripheral surface of the fourth surface and the side surface of the groove closest to the fourth surface is larger than a protrusion amount of the protrusion portion.

12. The reinforcement member for a vehicle according to claim 10,
wherein in the longitudinal direction, the protrusion amount of the protrusion portion in a central portion of the cylindrical body section is smaller than the protrusion amount of the protrusion portion in an end portion of the cylindrical body section.

13. The reinforcement member for a vehicle according to claim 3,
wherein each of the fourth surface and the fifth surface has a substantially flat plate shape.

14. The reinforcement member for a vehicle according to claim 13,
wherein a length of the fourth surface in the facing direction is approximately 20% to 80% of a distance between the first surface and the second surface.

15. The reinforcement member for a vehicle according to claim 13,
wherein an angle formed between the fourth surface and the second surface is approximately 85° to 90°.

16. The reinforcement member for a vehicle according to claim 1,
wherein a thickness of the cylindrical body section is approximately 1.0 mm to 2.3 mm.

17. A method for manufacturing the reinforcement member for a vehicle according to claim 1, the method comprising:
preparing a metal pipe between a first die and a second die;
forming a space for molding the cylindrical body section between the first die and the second die by moving at least one of the first die and the second die in a direction in which the dies join to each other; and
molding the cylindrical body section in the space by supplying gas into the metal pipe which is heated.

* * * * *